United States Patent [19]
Kondo et al.

[11] Patent Number: 5,327,306
[45] Date of Patent: * Jul. 5, 1994

[54] COMPACT MAGNETIC RECORDING AND REPRODUCING DEVICE HAVING MOVABLE REELS AND REEL SPINDLES

[75] Inventors: Yoshio Kondo, Tokyo; Kenichi Fukahori, Kanagawa, both of Japan

[73] Assignee: Sony Corporation, Tokyo, Japan

[*] Notice: The portion of the term of this patent subsequent to May 25, 2010 has been disclaimed.

[21] Appl. No.: 674,977

[22] Filed: Mar. 26, 1991

[30] Foreign Application Priority Data

Mar. 30, 1990 [JP] Japan ................................. 2-84302
Mar. 30, 1990 [JP] Japan ................................. 2-84303

[51] Int. Cl.⁵ .................... G11B 5/008; G11B 5/027; G11B 23/02
[52] U.S. Cl. ................................ 360/96.5; 360/96.6; 360/85; 360/132
[58] Field of Search ............. 360/84, 85, 94, 95, 360/96.5, 96.6, 132; 242/198, 199

[56] References Cited

U.S. PATENT DOCUMENTS

| | | | |
|---|---|---|---|
| 4,022,402 | 5/1977 | Morimoto | 242/199 |
| 4,641,210 | 2/1987 | Ohyama | 360/96.5 |
| 4,796,115 | 1/1989 | Ohshima et al. | 360/85 |
| 4,807,077 | 2/1989 | Zaitsu et al. | 360/95 |
| 4,903,149 | 2/1990 | Hasegawa et al. | 360/94 |
| 4,949,203 | 8/1990 | Kunimaru et al. | 360/85 |
| 4,985,789 | 1/1991 | Kodama et al. | 360/85 |
| 5,214,547 | 5/1993 | Kondo | 360/85 |
| 5,216,565 | 6/1993 | Yamaguchi | 360/85 |
| 5,224,004 | 6/1993 | Kondo | 360/132 |

FOREIGN PATENT DOCUMENTS

| | | |
|---|---|---|
| 0273640 | 7/1988 | European Pat. Off. |
| 0356985 | 3/1990 | European Pat. Off. |
| 0394975 | 10/1990 | European Pat. Off. |
| WO9016067 | 12/1990 | PCT Int'l Appl. |

Primary Examiner—A. J. Heinz
Assistant Examiner—Jefferson Evans
Attorney, Agent, or Firm—Lewis H. Eslinger; Jay H. Maioli

[57] ABSTRACT

A video camera with a tape deck mechanism in which the rotary head drum and tape loading device is inserted completely into a dead space in the tape cassette, the lid of the cassette is then closed and the recording/playback operation performed. The tape deck mechanism is reduced in size by having multiple chassis that slide into and fold over each other with the tape cassette contained therein. The tape deck mechanism operates in conjunction with a special tape cassette to increase the available dead space by moving the cassette tape reels apart when the head drum chassis slides into another chassis holding the cassette. The lid of the cassette is opened with a mechanism that does require pressure against the cassette to overcome the lid-closing spring of the cassette. The tape deck mechanism can be arranged with the known video camera electronics and optics in various configurations to provide a compact video camera.

23 Claims, 18 Drawing Sheets

COMPACT MAGNETIC RECORDING AND REPRODUCING DEVICE HAVING MOVABLE REELS AND REEL SPINDLES

BACKGROUND OF THE INVENTION

1. Field of the Invention

The present invention relates to a magnetic recording and reproducing device and, more particularly, to a compact device for recording and reproducing signals using a tape cassette in which the recording and reproducing heads are inserted into the tape cassette.

2. Description of the Background

Heretofore, efforts have been made to reduce the size of magnetic recording and reproducing devices, particularly video tape recorders (VTRs), for better portability. To obtain such a reduction in size, it has been customary to reduce the size of the deck mechanism that includes the tape transport system.

Various approaches have been followed in attempting to reduce the size of the deck mechanism and such prior attempts include a reduction in the size of the tape cassettes being used, a reduction in the diameter of the rotary head drum, and a more effective utilization of the dead space present in existing tape cassettes.

The proposal to reduce the size of the tape cassettes requires an adapter or a mechanism for moving the reel supports to cause the distance therebetween to match the smaller, different cassette size, so that compatibility between different cassette sizes is ensured.

According to the attempt to utilize the dead space in existing tape cassettes, a rotary head drum and a tape loading mechanism are partially inserted into the dead space in a tape cassette that has been loaded in the magnetic recording and reproducing device.

The use of tape cassettes of reduced size results in a complex operating procedure and a complex operating mechanism, because an adapter must be used or a reel support moving mechanism must incorporated.

The effort to reduce the diameter of the rotary head drum is subject to design limitations, because when a standard-size tape cassette is used there is a certain limitation imposed on the transport of the tape by the diameter of the rotary head drum around which the tape is wound.

The utilization of the dead space in existing tape cassettes to receive a portion of the rotary head drum and tape loading mechanism is an effective way to reduce the size of the deck mechanism, however, the extent to which the rotary head drum and the tape loading mechanism can be inserted into a tape cassette is limited by the dead space available. In addition, in such proposed mechanisms, the tape cassette is loaded onto one chassis, and the rotary head drum and the tape loading mechanism are supported on another chassis, the two chassis being movable with respect to each other. These two chassis have respective mating surfaces that bear the chassis, but the mating surfaces require overlapping portions that result in a device of greater than desired width.

More specifically, if the overlapping portions of the mating surfaces are too small then when the chassis are moved relative to each other, the chassis would tend to swing and become unstable and would not move back smoothly, thus preventing the rotary head drum and the tape loading mechanism from being reliably inserted into the tape cassette. In view of this drawback, the overlapping portions of the mating surfaces of the chassis have to be relatively large and, hence, the surface areas of the chassis must also be large. Increasing the surface areas of the chassis, however, results in an increase in the size of other components, presenting an obstacle to the efforts to reduce the size of the magnetic recording and reproducing device.

Furthermore, a conventional VTR tape cassette is loaded in the unit while the lid is held in the raised position against the resiliency of the lid closing spring, and the tape is withdrawn from the opening of the tape cassette, or recording and reproducing heads are inserted into the opening of the tape cassette, so that signals can be recorded on or reproduced from the tape. During the time the tape is being withdrawn from the cassette housing or the recording and reproducing heads are being inserted in the cassette housing, the tape cassette has to be held in a stable manner in the loaded position. Because the tape cassette is required to be retained in position under retentive forces strong enough to overcome the moment resulting from the resiliency of the lid-closing spring, the cassette loading unit needs a retentive biasing means for guiding the tape cassette into the loaded position and retaining the tape cassette reliably in the loaded position. As a consequence, the deck mechanism which constitutes the cassette loading unit is complex in structure and large in size.

OBJECTS AND SUMMARY OF THE INVENTION

Accordingly, it is an object of the present invention to provide a compact recording and reproducing device that can eliminate the above-noted defects inherent in the previously proposed systems.

It is another object of the present invention to provide a magnetic recording and reproducing device that comprises a small-size deck mechanism including a chassis constituting a loading unit for loading a tape cassette and another chassis serving as a support unit for the recording and reproducing heads, the two chassis being movable relative to each other smoothly, reliably, and in a stable manner through a simple arrangement.

A further object of the present invention is to provide a magnetic recording and reproducing device that has a simple and small cassette loading unit for loading a tape cassette therein, the magnetic recording and reproducing device being suitable for use with an arrangement which has recording and reproducing heads that are inserted into the tape cassette for recording signals on and reproducing signals from the tape cassette, in which the lid of the cassette is opened and closed without requiring a separate biased retaining mechanism to hold the cassette and overcome the resiliency of the lid-closing spring of the cassette.

In accordance with an aspect of the present invention, a magnetic recording and reproducing device for recording and reproducing signals in and from a tape cassette, in which the tape cassette has a pair of reels with a tape wound therearound, and the reels being movably housed in the cassette to obtain an increased dead space, includes a first chassis constituting a loading unit for loading the tape cassette into the device, and a second chassis supporting the recording and reproducing heads thereon. The first and second chassis are coupled for movement relative to each other, and a pair of reel supports are movably disposed on the first chassis through respective reel support chassis. The reel support chassis have end faces for cooperating with an end face of a head base of the recording and reproducing head supported on the second chassis, and the two reel support chassis are moved away from each other by the introduction of the head support chassis. A cassette lid opening and closing mechanism is provided that does not utilize the downward movement of the cassette for the opening operation and, thus, does not require a special cassette holding mechanism. Furthermore, once the head is inserted into the cassette the cassette lid can be closed and the recording or playback operation performed.

When the recording and reproducing heads are moved relative to the tape cassette having movable reels that has been loaded in the loading unit, the end face of the head base abuts the end faces of the reel support chassis, which are then pushed to vary the distance between the reel supports, and hence the distance between the reels in the tape cassette. Therefore, the dead space in the tape cassette is enlarged, allowing the recording and reproducing heads to be inserted completely into the dead space in the tape cassette. The tape in the tape cassette is then loaded around the tape guide drum and recording and reproducing heads now located within the tape cassette and the tape cassette lid is closed.

The reel supports are actuated by the mechanism that moves the recording and reproducing heads into the dead spaces of the tape cassette. By following the teaching of the present invention, the unit for loading the tape cassette therein may be of substantially the same size in plan as the tape cassette. Consequently, the deck mechanism of the magnetic recording and reproducing device is simplified in construction and greatly reduced in size.

In accordance with another aspect of the present invention, a magnetic recording and reproducing device for recording and reproducing signals in and from a tape cassette that has a front open side through which recording and reproducing heads can be inserted and a lid that is biased closed, includes a lid opening and closing mechanism for loading the tape cassette therein, in which the lid opening and closing mechanism is capable of opening and closing the lid of the tape cassette without relying on downward pressure on the cassette during the loading operation to overcome the force of the lidclosing spring.

When the tape cassette is loaded into the cassette loading unit and held in the loaded position, the lid is opened by the lid opening and closing mechanism, and recording and reproducing heads and a tape loading member are inserted into the tape cassette housing. Therefore, the lid is closed by the lid opening and closing mechanism and the tape is withdrawn from the tape cassette and loaded around the recording and reproducing heads for recording signals on and reproducing signals from the tape.

The above and other objects, features, and advantages of the present invention will become apparent from the following detailed description of illustrative embodiments thereof to be read in conjunction with the accompanying drawings, in which like reference numerals represent the same or similar elements.

DETAILED DESCRIPTION OF PREFERRED EMBODIMENTS

Figure 1:
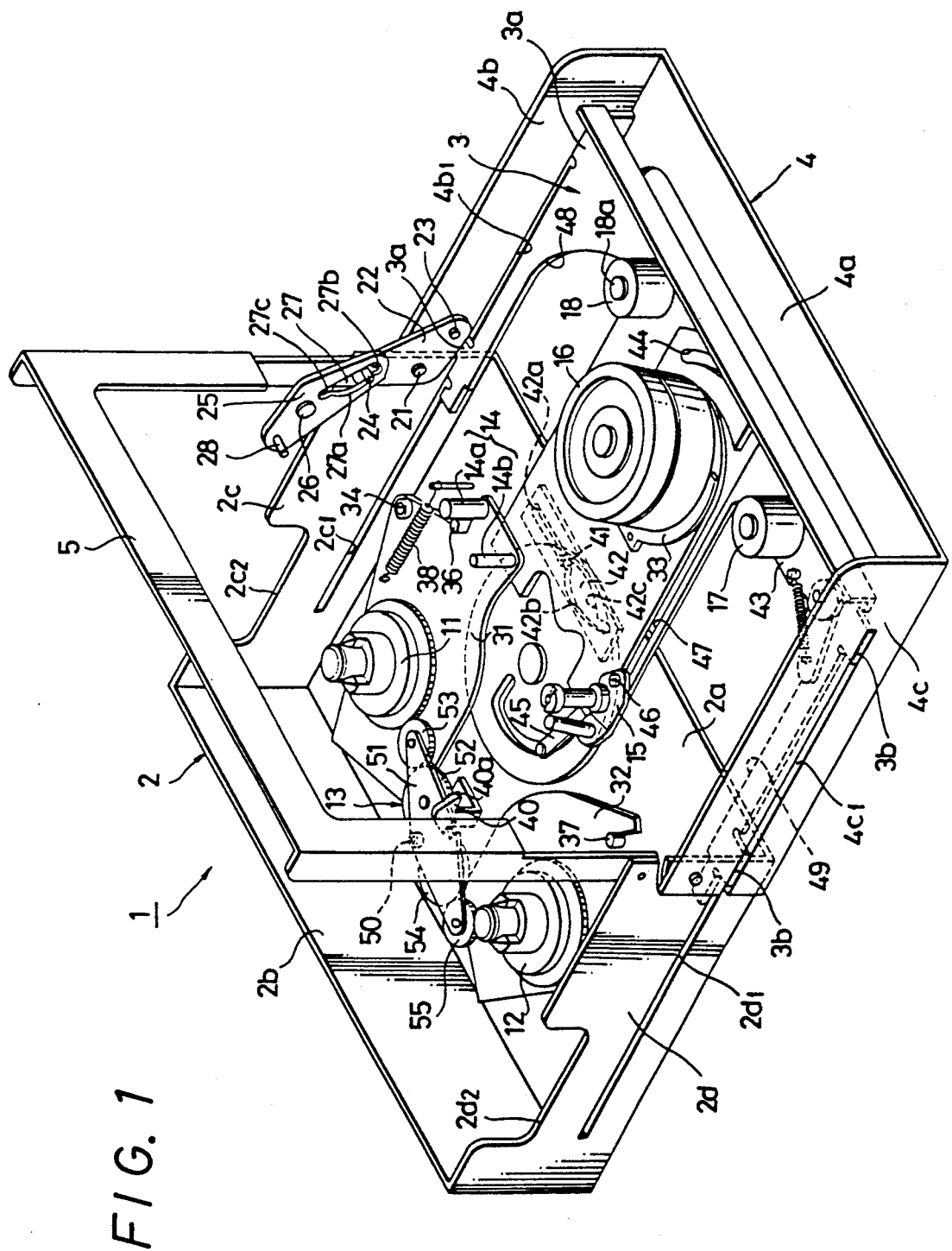
FIG. 1 is a perspective view of the tape loading mechanism of a magnetic recording and reproducing device according to an embodiment of the present invention, the mechanism being shown in an open position.
Figure 2:
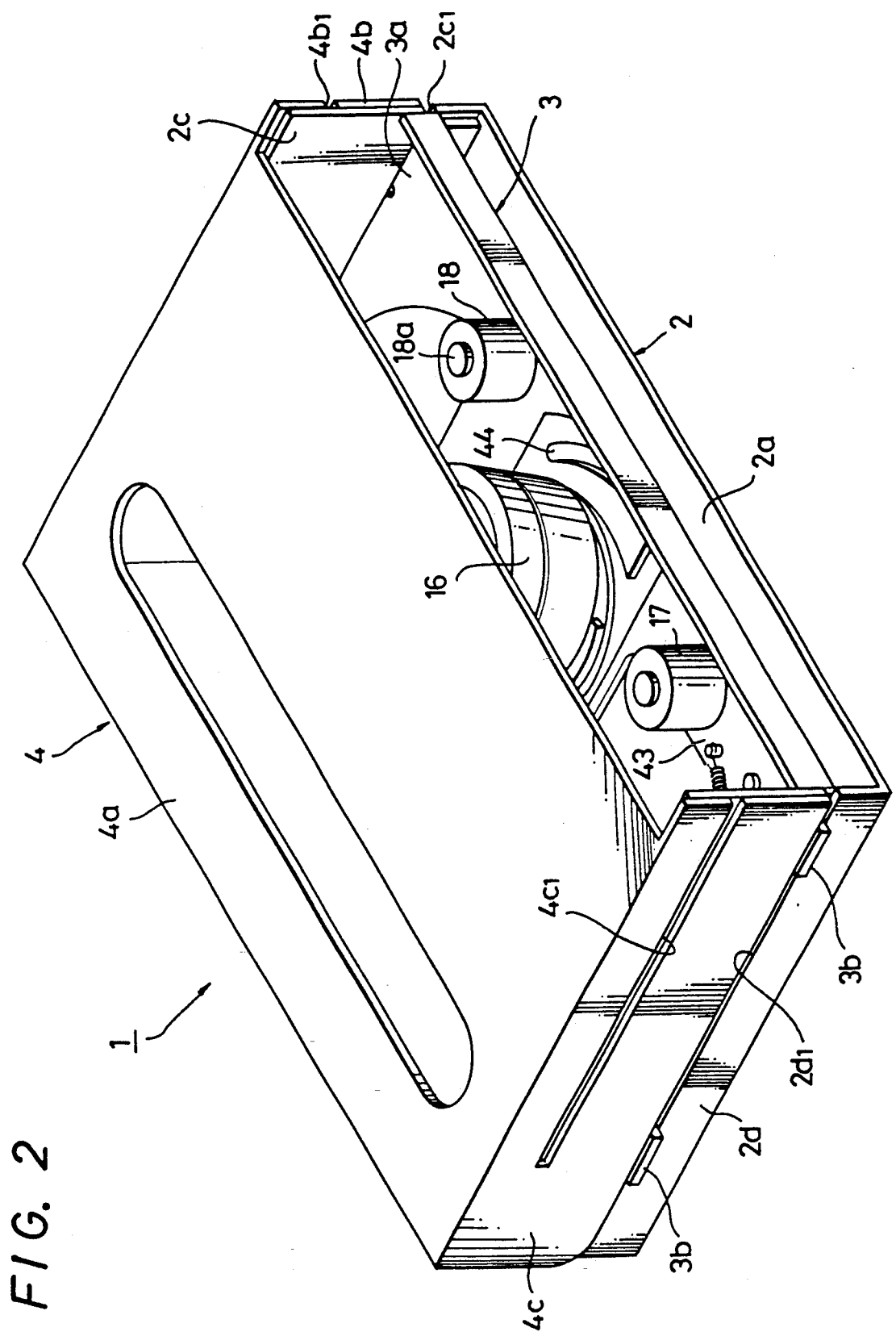
FIG. 2 is a perspective view of the tape loading mechanism of the magnetic recording and reproducing device of FIG. 1, shown in the closed position.

As shown in FIG. 1, a magnetic recording and reproducing device having a rotary head, for example, an 8-mm video tape recorder (VTR) according to the present invention includes a tape deck mechanism 1. Deck mechanism 1 comprises a first chassis 2 that is substantially the same size as an 8-mm tape cassette when viewed in plan. First chassis 2 is in the form of a casing which is composed of a lower panel 2a, a rear wall panel 2b, and a pair of side wall panels 2c, 2d. A second chassis 3 in the form of a plate is supported on the first chassis 2 and is slidable into and out of the first chassis 2. A third chassis 4, which is substantially the same size as the first chassis 2, is in the form of a lid that is composed of an upper panel 4a and a pair of side wall panels 4b, 4c. Side wall panels 4b, 4c of third chassis 4 are pivotally coupled at their rear ends to the front ends of side wall panels 2c, 2d of first chassis 2, so that third chassis 4 is angularly movable toward and over first chassis 2 to close an upper, open side thereof, as shown in FIG. 2. Third chassis 4 is also movable away from first chassis 2 to open the upper, side thereof, as shown in FIG. 1. When third chassis 4 is angularly moved away from first chassis 2 to the point where third and first chassis 4, 2 are in planar alignment with each other, then second chassis 3 can slide from first chassis 2 into third chassis 4, as shown in FIG. 1.

Figure 3A:
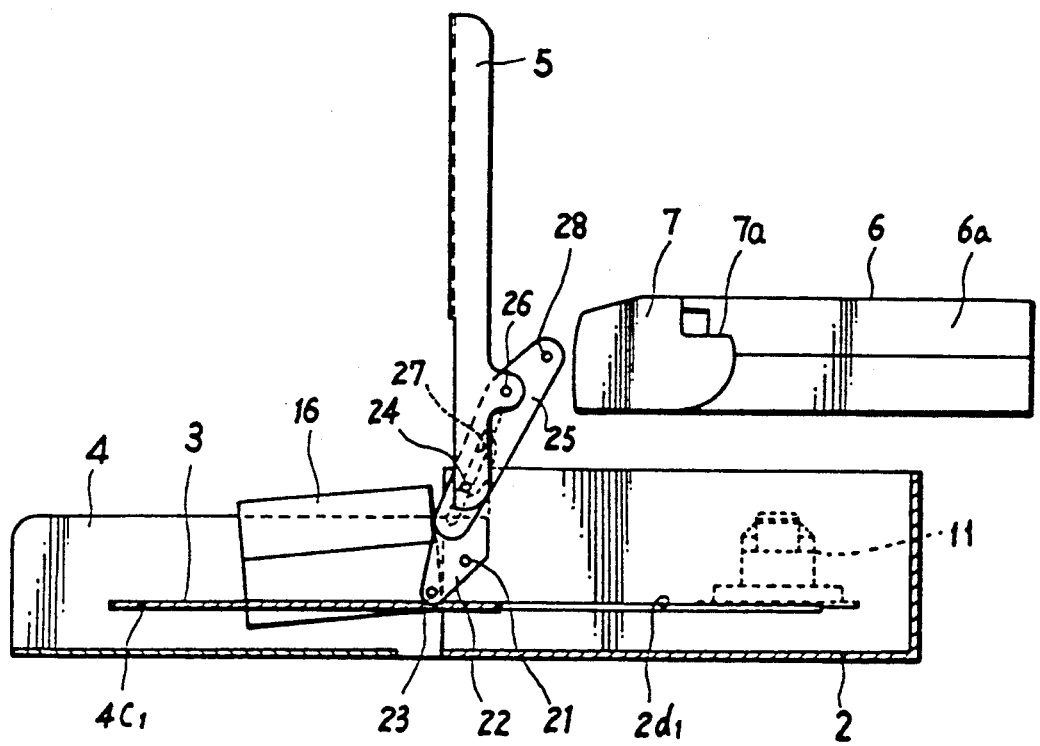
FIG. 3A through 3F are cross-sectional views showing the manner in which the multiple chassis of the tape loading mechanism of the magnetic recording and reproducing device of FIG. 1 operates.
Figure 5:
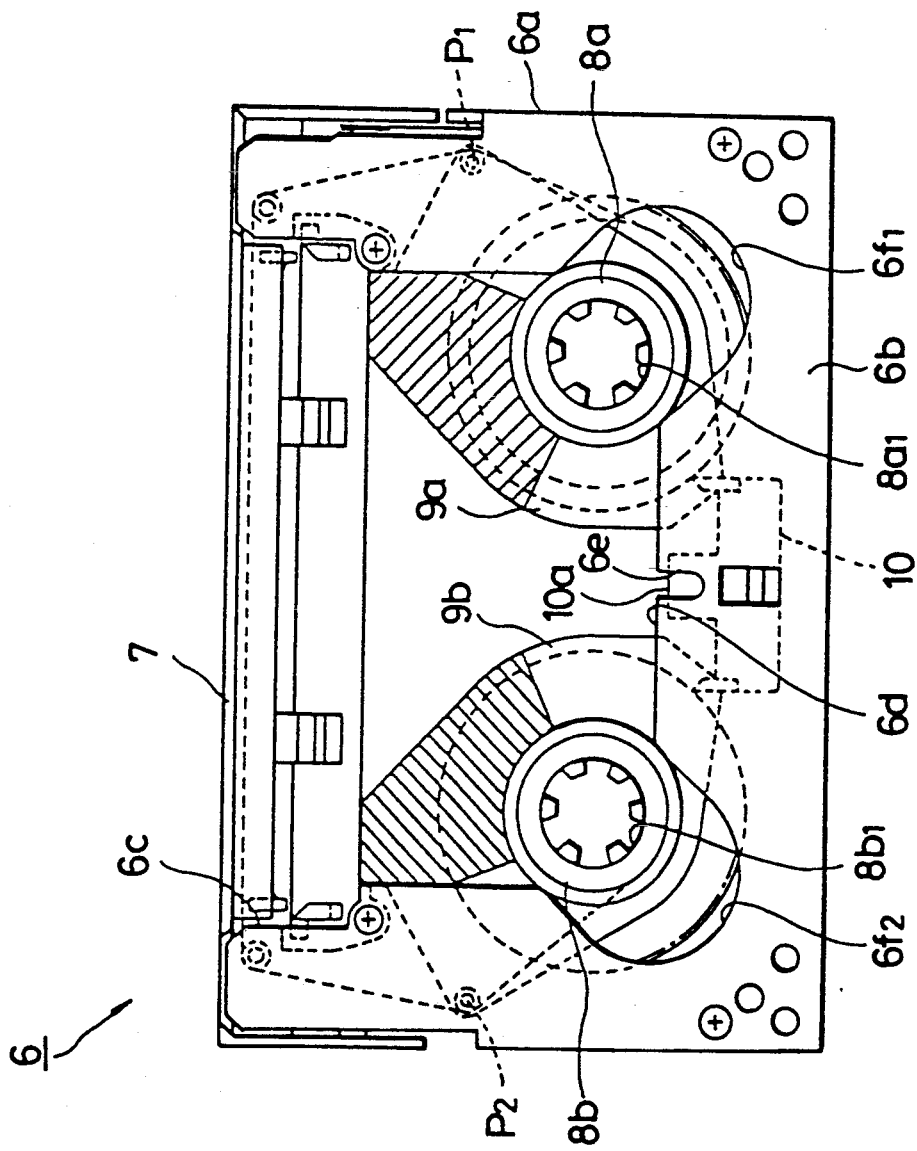
FIG. 5 is a bottom plan view of a tape cassette with movable tape reels suitable for use with the magnetic recording and reproducing device according to the present invention.
Figure 6:
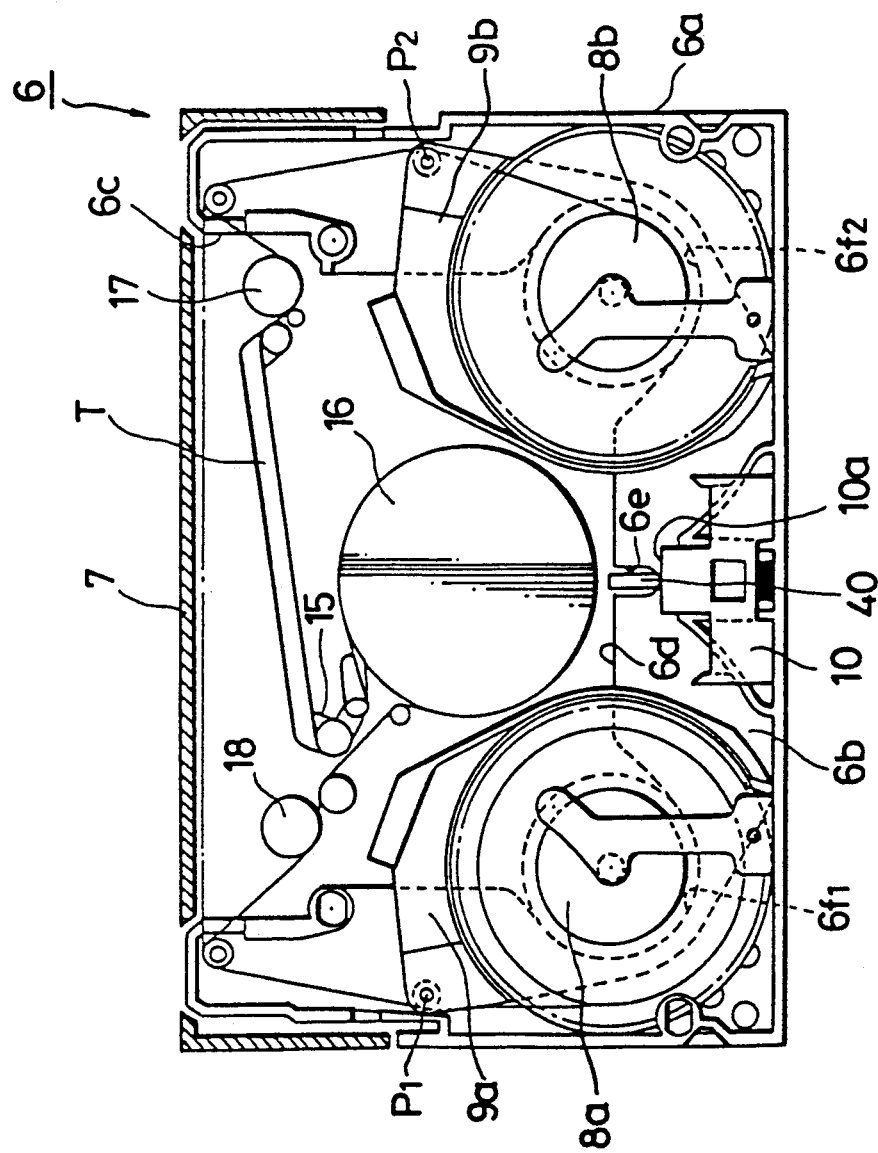
FIG. 6 is a top plan view in cross-section showing the manner in which the tape cassette of FIG. 5 operates.

Deck mechanism 1 also includes a cassette presser frame 5 pivotally coupled to the front ends of side wall panels 2c, 2d at the front open side of first chassis 2. Cassette presser frame 5 is angularly movable toward and over the upper open side of first chassis 2 for holding a tape cassette 6, which is stored in the first chassis 2. This position is shown in FIGS. 3A, 5, and 6.

To allow second chassis 3 to slide from first chassis 2 to third chassis 4 when third chassis 4 is angularly moved away from first chassis 2, side wall panels 2c, 2d of first chassis 2 have respective guide slots 2c1, 2d1 formed therein, and second chassis 3 has pairs of tongues 3a, 3b projecting from opposite side edges thereof and slidably riding in the respective guide slots 2c1, 2d1. Side wall panels 4b, 4c of third chassis 4 also have respective guide slots 4b1, 4c1 defined therein that will be linearly aligned with the respective guide slots 2c1, 2d1 of first chassis 2 when third chassis 4 is angularly moved away from first chassis 2 into coplanar alignment therewith. Therefore, second chassis 3 can move from first chassis 2 to third chassis 4, while tongues 3a, 3b are sliding along and out of guide slots 2c1, 2d1 into guide slots 4b1, 4c1.

First chassis 2 houses therein a tape supply reel support 11 and a tape takeup reel support 12, a reel support drive mechanism 13 for selectively driving the supply and takeup reel supports 11, 12, a tape guide post assembly 14 including first and second tape guide posts 14a, 14b, and a tape loading mechanism 15. Second chassis 3 supports thereon a rotary head drum 16 incorporating a drive motor and recording and reproducing heads, not shown, a pinch roller 17, and a tension roller 18.

In regard to the manner in which third chassis 4 is pivotally attached to first chassis 2, a first link 22 is angularly movably supported on a shaft 21 attached to first chassis 2. First link 22 has one end fixed to side wall panel 4b of third chassis 4 by a pin 23, so that first link 22 is angularly movable in unison with third chassis 4, and the opposite end of first link 22 supports an engaging pin 24. A second link 25 is pivotally supported at its central portion on one of the pivoted ends of the cassette presser frame 5 by a shaft 26. Second link 25 has a groove or slot 27 formed in a portion thereof toward one side of shaft 26, and engaging pin 24 is movably received in slot 27. Second link 25 supports a presser pin 28 on an end thereof that is on the other side of shaft 26 opposite slot 27.

Slot 27 includes a relief portion 27a in which engaging pin 24 of first link 22 slides, as first link 22 turns in unison with the third chassis 4 when the third chassis 4 is angularly moved away from first chassis 2, thereby opening first chassis 2. Slot 27 also includes a disengaging portion 27b from which engaging pin 24 is released and freed when third chassis 4 is angularly moved away from first chassis 2 in coplanar alignment therewith. Slot 27 further includes an engaging portion 27c which is engaged and pushed by engaging pin 24 when third chassis 4 is angularly moved toward and over first chassis 2, thereby closing first chassis 2.

When third chassis 4 is angularly moved away from first chassis 2 into coplanar alignment therewith, thus opening first chassis 2, and also when cassette holder frame 5 is raised into a substantially vertical position relative to such plane, second link 25 is rotated into an erected position, so that presser pin 28 is moved upwardly relative to first chassis 2, as shown in FIG. 3A.

In the operation of this mechanism, a tape cassette 6 is now loaded into first chassis 2, so that the two tape reels, not shown, in a cassette housing 6a of tape cassette 6 are engaged respectively by the reel supports 11, 12.

Figure 3B:
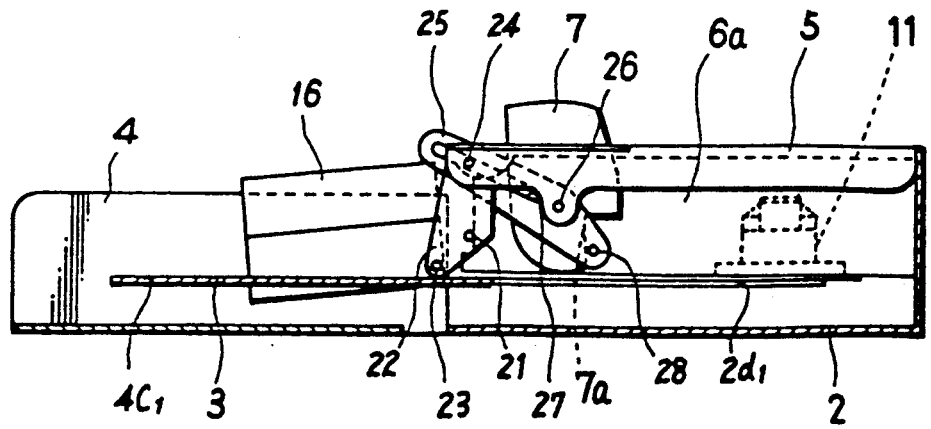

Then, as shown in FIG. 3B, the cassette presser frame 5 is angularly moved downwardly over the upper open side of first chassis 2, thereby pressing the loaded tape cassette 6. Second link 25 is also rotated downwardly to cause presser pin 28 to engage and press downwardly an arm 7a projecting rearwardly from a pivoted portion of a lid 7 of tape cassette 6. Lid 7 is thus turned upwardly, opening the front of tape cassette 6 and exposing the tape. When cassette presser frame 5 is further angularly moved downwardly so that it completely presses tape cassette 6 onto first chassis 2, this causes second link 25 to be further rotated to enable presser pin 28 to raise lid 7 to its fully erected and opened position.

Figure 3C:
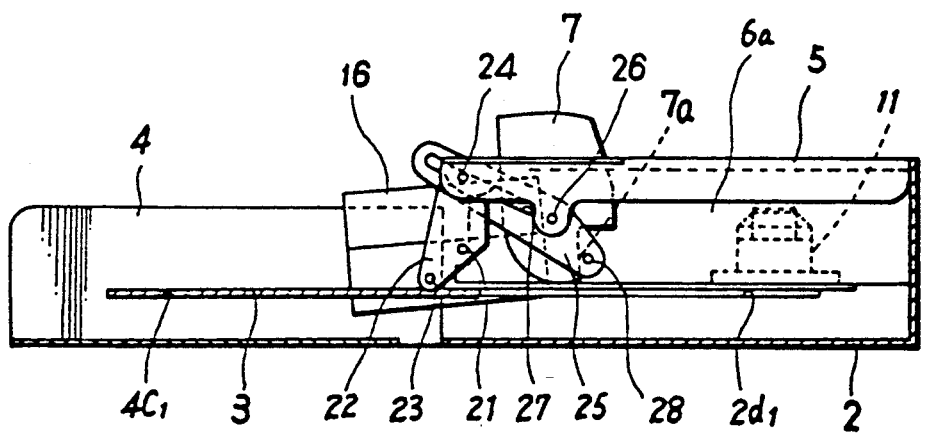
Figure 3D:
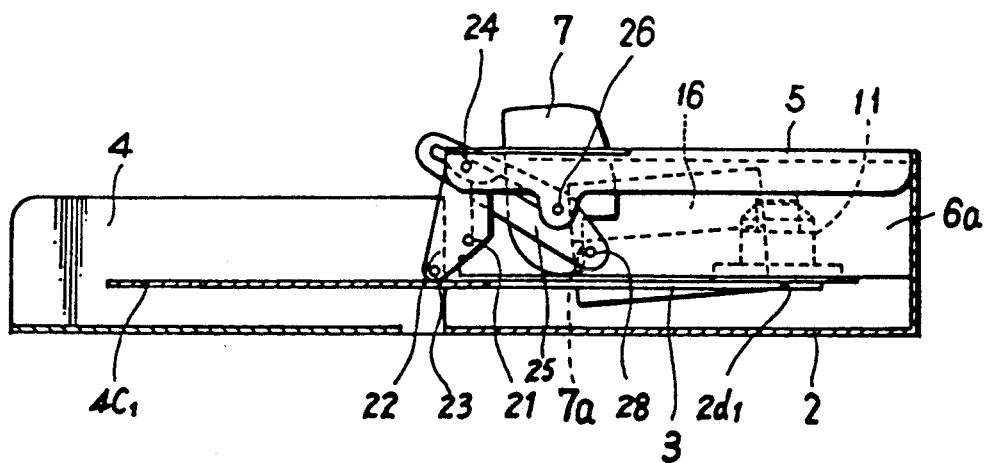

Thereafter, second chassis 3 is moved from third chassis 4 toward first chassis 2, as shown in FIG. 3C, for inserting rotary head drum 16, pinch roller 17, and tension roller 18 through the opened, front side of tape cassette 6 into the dead space in cassette housing 6a of tape cassette 6 until second chassis 3 resides entirely within first chassis 2, as shown in FIG. 3D.

Figure 3E:
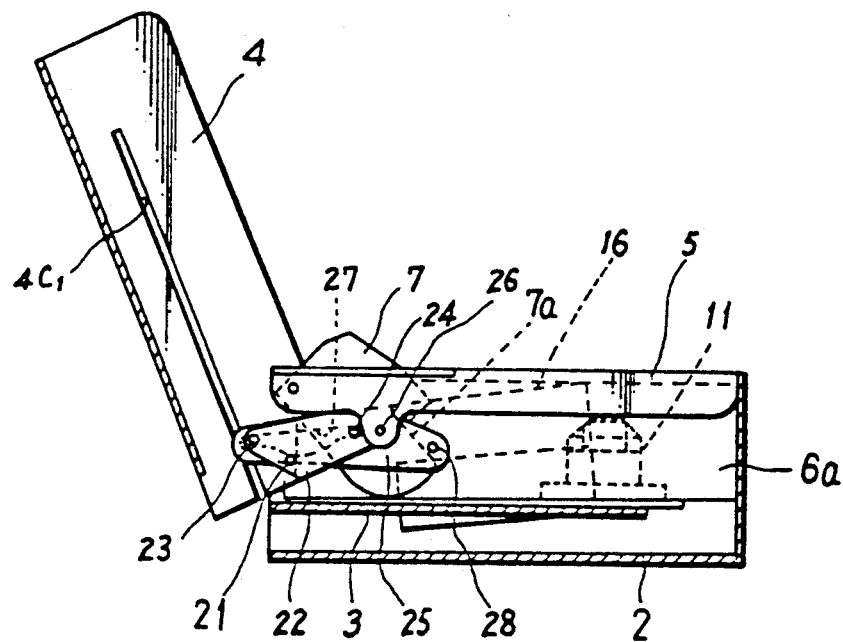
Figure 3F:
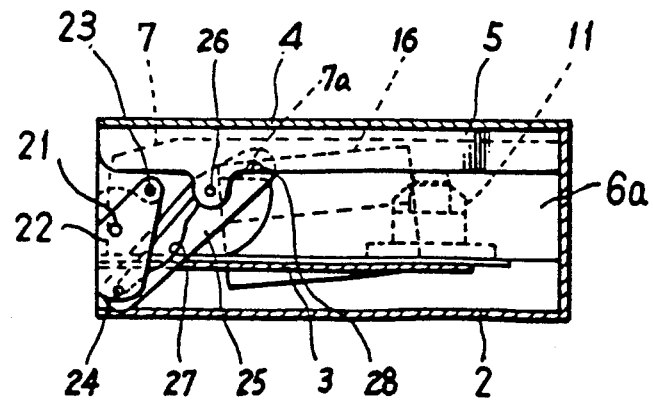

When third chassis 4 is then angularly moved toward and over first chassis 2 to close first chassis 2, first link 22 is also rotated in unison with the third chassis 4 and pivoted about pin 21. Engaging pin 24 on first link 22 slides into pushing engagement with engaging portion 27c of slot 27 of second link 25, so that second link 25 is now rotated about shaft 26 in a direction to elevate presser pin 28 out of pressing engagement with arm 7a of tape cassette lid 7. All such tape cassettes employ a spring that biases the lid into a closed position, so that lid 7 now starts to be automatically closed under the spring bias that normally urges lid 7 shut, as shown in FIG. 3E. When third chassis 4 is fully closed upon first chassis 2, second link 25 having slot 27 is pushed by first link 22 to further elevate pin 28, thereby fully releasing lid 7 and permitting it to close. Lid 7 now fully closes the front side of tape cassette 6, as shown in FIG. 3F. At such time, the tape in tape cassette 6 is loaded around rotary head drum 16 for recording or playback.

When third chassis 4 is thereafter angularly moved back to open first chassis 2, second link 25 is rotated by first link 22 to displace presser pin 28 downwardly. Presser pin 28 presses against arm 7a of lid 7 of tape cassette 6, whereupon lid 7 starts to open at the front of tape cassette 6. Third chassis 4 is subsequently angularly moved away from first chassis 2 until third chassis 4 is positioned into coplanar alignment with the first chassis 2, at which time lid 7 is in the fully opened position, thus fully opening the front of tape cassette 6. Second chassis 3 can now slide back out of first chassis 2 back toward third chassis 4, displacing rotary head drum 16, pinch roller 17, and tension roller 18 from the dead space in tape cassette 6.

Cassette presser frame 5 is then rotated back into the vertical position. Second link 25 is also rotated upwardly in unison with cassette presser frame 5, so that arm 7a of lid 7 is released from presser pin 28, thereby closing the front of tape cassette 6 and covering the tape. The closed tape cassette 6 can then be removed from first chassis 2.

During the above operation, second chassis 3 is smoothly guided, without any swinging or rocking movement, between first chassis 2 and third chassis 4 by tongues 3a, 3b of the second chassis 3 sliding along guide slots 2c1, 2d1 and 4b1, 4c1 that are linearly aligned when third chassis 4 is fully angularly moved away from first chassis 2 and is coplanar therewith.

As described above, rotary head drum 16 is mounted on second chassis 3 and supply and takeup reel supports 11, 12 are rotatably mounted respectively on reel support chassis 31, 32, which are mounted on first chassis 2. As shown in FIGS. 1 and 4A through 4D, the reel support chassis 31, 32 are mounted side by side and spaced apart on a lower panel 2a of first chassis 2, so that one will be located at each side of rotary head drum 16 when it is moved into first chassis 2. Reel support chassis 31, 32 are positioned on first chassis 2 at substantially the same height as a head drum base 33 by which rotary head drum 16 is mounted on second chassis 3. Reel support chassis 31, 32 are mounted for pivoting movement on lower panel 2a by respective shafts 34, 35, which are equidistantly spaced from the axes of reel supports 11, 12, respectively.

The reel support chassis 31, 32 are normally urged to pivot into engagement with respective stopper pins 36, 37 by springs 38, 39, so that reel supports 11, 12 normally remain spaced apart from each other by a predetermined distance. First and second tape guide posts 14a, 14b of the tape guide post assembly 14 are spaced apart from each other and are vertically disposed on a front edge of the reel support chassis 31.

Figure 4A:
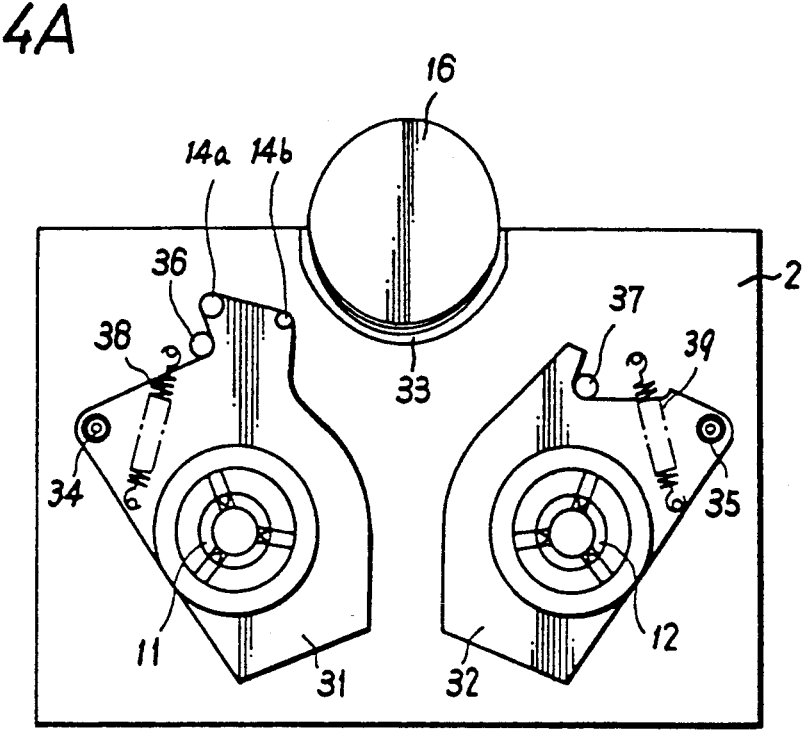
FIGS. 4A through 4D are plan views of the device of FIG. 1 showing the manner in which the tape reel supports are displaced by introduction of a rotary head drum.
Figure 4B:
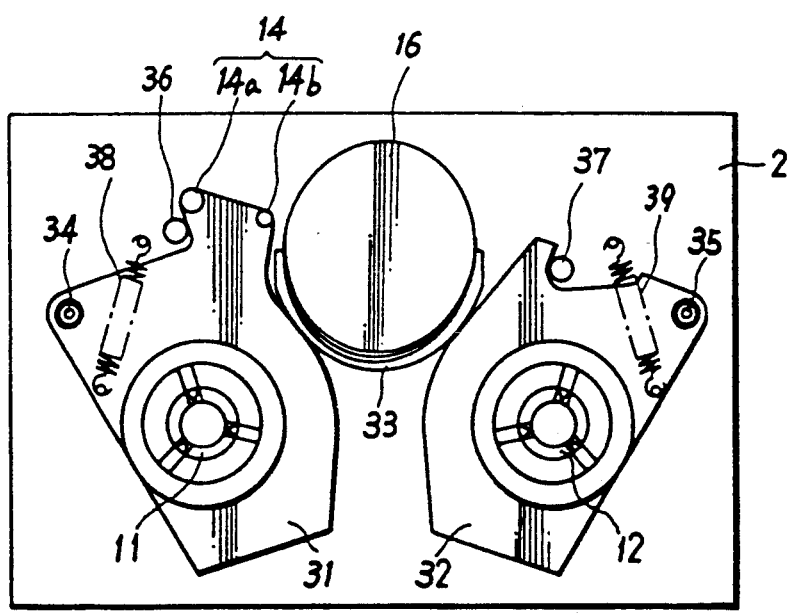
Figure 4C:
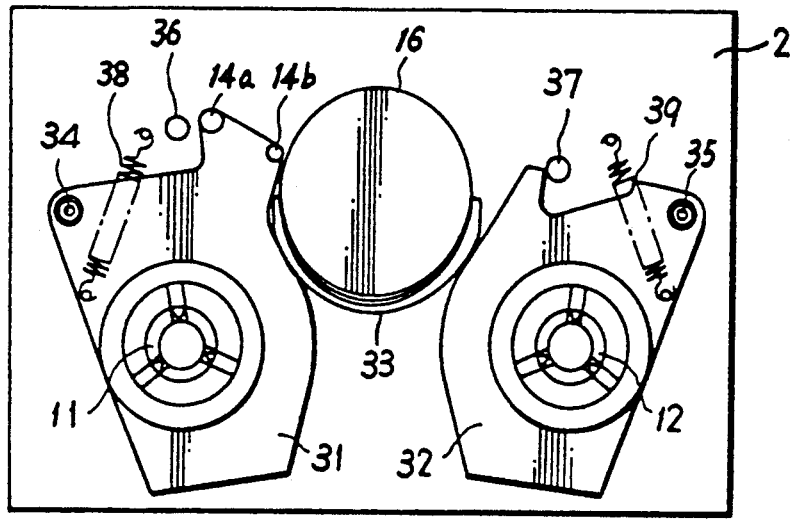
Figure 4D:
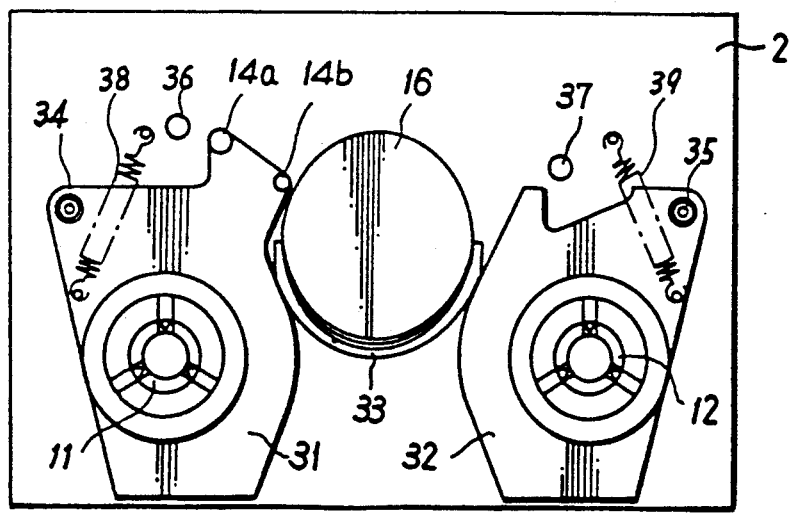

With reel supports 11, 12 and rotary head drum 16 being thus arranged, when second chassis 3 is displaced toward third chassis 4 that has been angularly moved away from first chassis 2, rotary head drum 16 is arranged in front of reel supports 11, 12, as shown in FIGS. 1 and 4A. When second chassis 3 is moved into first chassis 2, rotary head drum 16 is also moved with second chassis 3 toward reel supports 11, 12 in first chassis 2, until an end face of a head drum base 33 abuts against respective inner end faces of reel support chassis 31, 32, as shown in FIG. 4B. Continued movement of second chassis 3 into first chassis 2 causes head drum base 33 to push reel support chassis 31, 32 against the bias of springs 38, 39, so that reel support chassis 31, 32 are turned about the respective shafts 34, 35, as shown in FIG. 4C. When second chassis 3 is fully moved into first chassis 2, the two reel support chassis 31, 32 are angularly displaced away from each other toward their limit positions by head drum base 33, thus increasing the distance between the reel supports 11, 12. Rotary head drum 16 is now positioned between reel supports 11, 12, as shown in FIG. 4D.

Tape cassette 6 has a supply reel 8a and a takeup reel 8b, which are housed in the cassette housing 6a, as shown in FIGS. 5 and 6. To be useful in this embodiment of the present invention supply and takeup reels 8a, 8b are movable in certain directions from their predetermined at-rest positions. Specifically, as shown in FIG. 5 supply and takeup reels 8a, 8b are spaced a predetermined distance from each other and are locked in their predetermined positions during a normal, at-rest condition. When the supply and takeup reels 8a, 8b are unlocked, they are free to move in the same directions in which reel supports 11, 12 are movable to the positions as shown in FIG. 6.

In the condition, shown for example in FIG. 1, when third chassis 4 is angularly moved away from first chassis 2 into coplanar alignment therewith, thus opening first chassis 2, and also in the condition when second chassis 3 is moved into third chassis 4 and cassette presser frame 5 is erected, first chassis 2 is rendered open and rotary head drum 16 is displaced out of first chassis 2. Under this condition, reel supports 11, 12 in first chassis 2 are positioned in normally spaced-apart relationship to each other, with reel support chassis 31, 32 held against the respective stopper pins 36, 37 under the force of springs 38, 39.

When tape cassette 6 shown in FIG. 5 is then loaded into first chassis 2, reels 8a, 8b in tape cassette 6 are engaged by the respective reel supports 11, 12, and unlocked by an unlocking member 40 mounted on first chassis 2, as shown in FIG. 6.

Then cassette presser frame 5 is rotated downwardly to press tape cassette 6 into the loaded position in first cassette 2. As described above, second link 25 is turned to cause presser pin 28 to press arm 7a of lid 7, which is turned to open the front of tape cassette 6.

After the tape cassette 6 is opened, second chassis 3 is moved into first chassis 2 and rotary head drum 16 on second chassis 3 is inserted into tape cassette 6 through the now opened front side thereof. Upon insertion of rotary head drum 16 into tape cassette 6, head drum base 33 engages and presses reel support chassis 31, 32, thereby angularly displacing reel supports 11, 12 away from each other against the resiliency of springs 38, 39. Because the reels 8a, 8b in tape cassette 6 are engaged with reel supports 11, 12, respectively, they are also displaced away from each other in unison with reel supports 11, 12. Accordingly, the dead space available in tape cassette 6 is increased, so that rotary head drum 16 can enter the increased dead space and be fully inserted into tape cassette 6.

Third chassis 4 is then moved and folded over first chassis 2, during which operation section link 25 is released from lid 7, which automatically closes the front lid 7 of tape cassette 6. Consequently, third chassis 4 is neatly held against the first chassis 2 in fully superposed relation, thus completely closing the upper open side of first chassis 2. Third chassis 4 and first chassis 2 in this combined or folded-together form are of substantially the same size and shape as the tape cassette that is loaded therein.

Second chassis 3 is moved in and out by a drive motor, not shown, mounted on first chassis 1 and second chassis 3 has a slot or groove 42 in which a pin 41 is engaged and that is circumferentially movable by the drive motor, as shown in FIG. 1. Groove 42 functions as a cam and includes an actuating portion 42a, along which pin 41 slides to move the second chassis 3 when the pin 41 is driven in circular motion by the drive motor, and relief portions 42b, 42c along which the pin 41 idly moves when the tape in tape cassette 6 is loaded around rotary head drum 16 and also when tape cassette 6 is unlocked for ejection.

Pinch roller 17, which is located on one side of rotary head drum 16, is rotatably supported on a pinch roller arm 43 mounted on second chassis 3. Tension or drag roller 18, which is located on the other side of rotary head drum 16, is rotatably supported on second chassis 3 by a shaft 18a. Second chassis 3 has an arcuate guide slot 44 formed therein and positioned near and extending partly around rotary head drum 16. Tape loading mechanism 15 is movable along the arcuate guide slot 44. Second chassis 3 also has a straight transverse relief slot 47 receiving a pin 46 of a loading arm 45 on which tape loading mechanism 15 is supported. Relatively large transverse cut-outs or recesses 48, 49 are positioned on the opposite sides, respectively, of rotary head drum 16 for receiving the shafts of reel supports 11, 12, respectively when second chassis 3 is moved into first chassis 2.

As shown in FIG. 1, reel support drive mechanism 13, which is disposed in first chassis 2 for selectively transmitting drive forces to reel supports 11, 12, comprises a support plate 51 having a central bearing 50 thereon, a pair of larger, inner gears 52, 54 rotatably mounted on support plate 51, one on each side of bearing 50, and a pair of smaller, outer gears 53, 55 rotatably mounted on respective outer ends of support plate 51 and held in mesh with the larger gears 52, 54, respectively. Outer gears 53, 55 can be selectively alternately brought into mesh with respective gears 11a, 12a of the reel supports 11, 12 when the support plate 11 is pivoted about its central axis. Because reel support drive mechanism 13 has four gears 52, 53, 54, 55, it can reliably transmit drive forces to the reel supports 11, 12, even when the relatively movable reel supports 11, 12 are spaced the maximum distance from each other.

Side wall panels 2c, 2d of first chassis 2 have respective cut-outs or recesses 2c2, 2d2 formed in upper rear edges thereof to facilitate manual insertion and removal of tape cassette 6 into and out of first chassis 2.

Member 40 that is used for unlocking reels 8a, 8b in tape cassette 6 is mounted in first chassis 2, as shown in FIGS. 1 and 6, and has a substantially triangular presser element 40a that is inserted upwardly into cassette housing 6a of tape cassette 6 as it is loaded into first chassis 2, and thereby acts to push a lock member 10 in cassette 6 that is used to lock reels 8a, 8b.

The operation of the various elements mounted on second chassis 3, such as the rotary head drum 16, tape loading mechanism 15, and reel supports 11, 12, is accomplished by an ordinary conventional actuator mechanism typically including a motor, speed reducer gears, and other known components, therefore, in the interest of clarity and brevity the actuator mechanism is not illustrated and need not be described herein.

The tape cassette 6 that can be loaded into the deck mechanism 1 of FIG. 1 is shown in more detail in FIG. 5. Cassette housing 6a of tape cassette 6 has an open, recessed area 6d in a bottom panel 6b that is contiguous to a front open side 6c of the cassette housing 6a. Supply and takeup reels 8a, 8b in cassette housing 6a are rotatably supported on respective reel holders 9a, 9b that are disposed in cassette housing 6a above open area 6d. Reel holders 9a, 9b are pivotally supported in cassette housing 6a by respective shafts P1, P2, so that reel holders 9a, 9b are angularly movable toward and away from each other and move generally linearly toward the rear corners of cassette housing 6a. Supply and takeup reels 8a, 8b have respective central holes 8a1, 8b1 opening downwardly for receiving respective upraised shafts of supports 11, 12 when cassette 6 is loaded onto first chassis 2. When tape cassette 6 is loaded onto first chassis 2, the shafts P1, P2 about which reel holders 9a, 9b are swingable with respect to cassette housing 6a are axially aligned with the respective shafts 34, 35 about which reel supports 11, 12 are angularly movable, that is, pivotable with respect to the first chassis 2.

As shown in FIGS. 5 and 6, cassette housing 6a also houses reel lock member 10 in a rear portion thereof at the end opposite lid 7, for locking reels 8a, 8b and reel holders 9a, 9b in position. Lock member 10 is normally resiliently urged in a forward direction to lock reels 8a, 8b and reel holders 9a, 9b. At this time, a front end portion 10a of lock member 10 is located across a cavity 6e formed at the rear edge of the open area 6d in the bottom panel 6b.

When tape cassette 6 is loaded into first chassis 2 and pressed downwardly, unlock member 40 is inserted into cavity 6e and presser 40a of unlock member 40 pushes the front edge 10a of the lock member 10 against the resilient forces applied thereto, thereby unlocking reels 8a, 8b and reel holders 9a, 9b, which are now free to pivot back into the expanded position.

The bottom panel 6b of cassette housing 6a also has a pair of recesses 6f1, 6f2 formed therein near respective rear corners thereof and contiguous to open area 6d, for receiving the respective reels 8a, 8b. Recesses 6f1, 6f2 extend along the respective paths of the swingable reel holders 9a, 9b of the tape deck mechanism 1 shown in FIG. 1.

FIG. 6 shows tape cassette 6 with rotary head drum 16 and tape loading mechanism 15 inserted in the increased space made available in cassette housing 6a. After lid 7 is closed, the magnetic tape T in the tape cassette 6 is loaded around rotary head drum 16 by tape loading mechanism 15, so that the recording and reproducing heads on rotary head drum 16 are ready to record signals on and reproduce signals from the magnetic tape T.

The present invention also provides an improved system for opening and closing the lid on the tape cassette, which is shown in FIGS. 5 and 6. Tape cassettes for use in magnetic recording and reproducing devices, particularly video tape recorders (VTRs) including 8-mm, digital audio tape recorders (DATs), or the like have lids for closing tape withdrawal openings so that the tape cassettes can easily be maintained and handled and the tapes can be protected from damage and dust. Heretofore, the tape cassette lid was opened utilizing the downward pressure of the cassette operating against the spring force used to keep the lid closed.

An example of such known lid opening operation is shown in FIGS. 9A through 9D, in which a conventional 8-mm VTR 100 has a cassette loading unit 100a including a lid raising member 61 for opening lid 7 of tape cassette 6 to allow the tape to be withdrawn therefrom and wrapped around a rotary head drum when tape cassette 6 is loaded into cassette loading unit 100a. Lid 7 is normally urged by a spring, not shown, into a closed position and lid raising member 61 has an engaging pin 61a for opening lid 7 when tape cassette 6 is loaded.

To load tape cassette 6 into cassette loading unit 100a, cassette housing 6a of tape cassette 6 is lowered while a lower edge of closed lid 7 is being engaged by engaging pin 61a of lid raising member 61. Because lid 7 is caught by engaging pin 61a and the loading operation continues cassette housing 6a is lowered, lid 7 is pivoted upwardly against the bias of the lid-closing springs so that lid 7 is opened with respect to cassette housing 6a. Consequently, after cassette housing 6a is lowered, tape cassette 6 remains loaded under forces that are strong enough to overcome the resiliency of the lid-closing spring, during which time signals are recorded and reproduced from the tape with lid 7 being held open.

As noted hereinabove, in VTRs in which the lid is held in the raised position under the resiliency of the lid-closing spring and the tape is withdrawn from the opening of the tape cassette, or recording and reproducing heads are inserted into the opening of the tape cassette, the tape cassette has to be held stably in the loaded position. Because the tape cassette must be held in position under retentive forces strong enough to overcome the moment resulting from the resiliency of the lid-closing spring, the cassette loading unit needs a mechanism for guiding the tape cassette into the loaded position and retaining the tape cassette reliably in the loaded position against the lid-closing spring force.

FIGS. 7A through 7F and 8A through 8F show mechanisms for opening and closing the lid of a tape cassette, according to embodiments of the present invention other than that shown and discussed in connection with FIG. 1.

The lid opening and closing mechanism shown in FIGS. 7A through 7F employs a sector gear for opening the lid of a tape cassette. More specifically, a deck mechanism 102 includes a loading unit 102a in the form of a casing for loading a tape cassette 6 therein. A sector gear 62 is rotatably mounted on a side wall panel of loading unit 102a in a position corresponding to a side of lid 7 of tape cassette 6. Sector gear 62 is held in mesh with a drive gear 61 and is rotatably movable in one direction and the other, upwardly and downwardly. Sector gear 62 has mounted on an upper inner surface thereof a presser pin 63 for engaging an arm 7a projecting rearwardly from lid 7 of tape cassette 6.

Figure 7A:
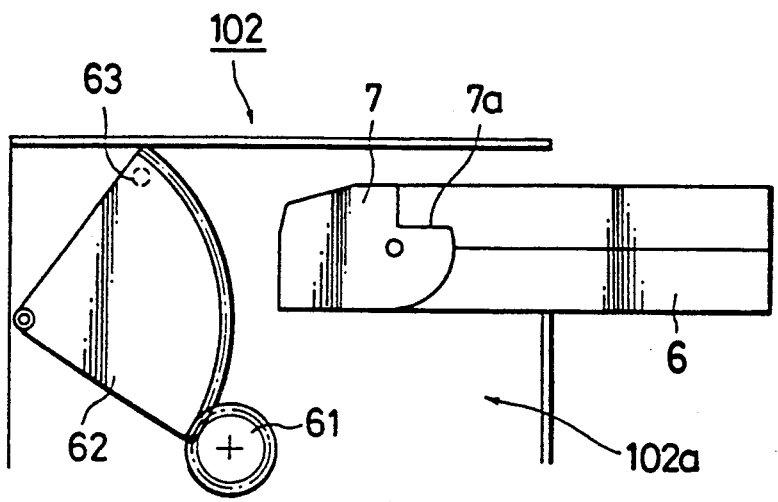
FIGS. 7A through 7F are elevational views showing a cassette lid opening mechanism according to an embodiment of the present invention.
Figure 7B:
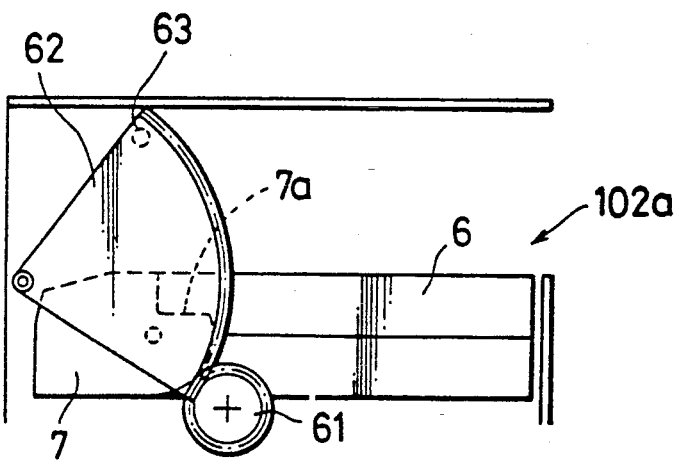
Figure 7C:
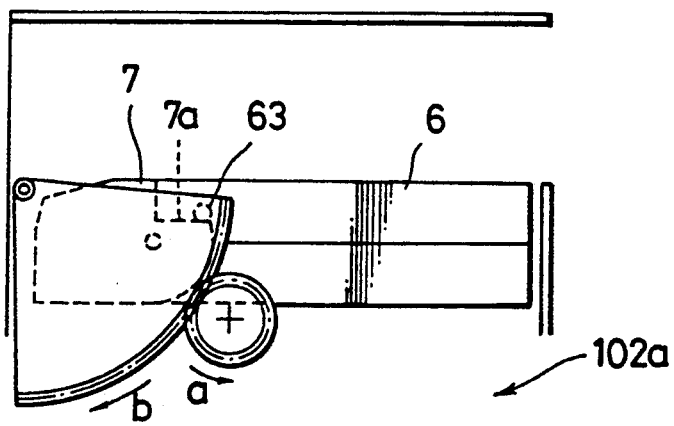
Figure 7D:
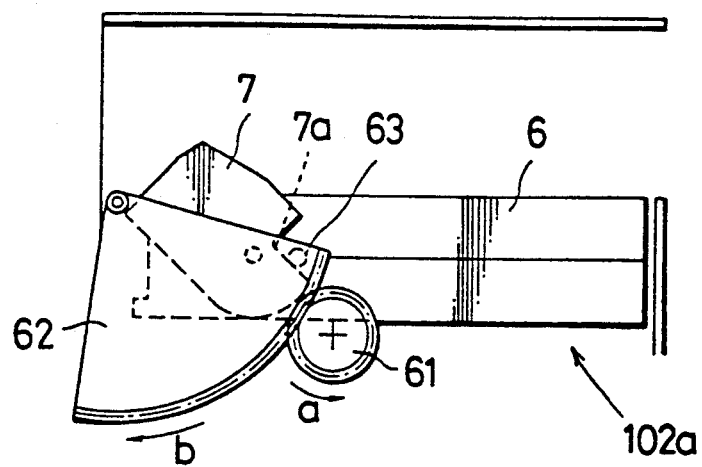
Figure 7E:
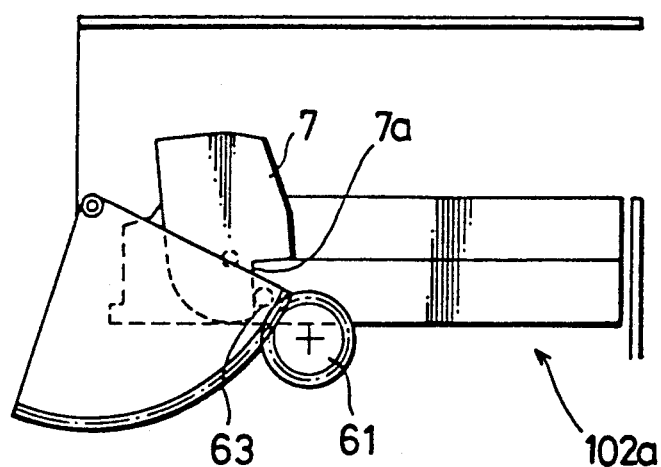

When tape cassette 6 is inserted into the loading unit 102a, as shown in FIG. 7A, and lowered into a predetermined position, as shown in FIG. 7B, drive gear 61 is rotated counterclockwise in the direction indicated by the arrow a in FIG. 7C, causing sector gear 62 meshing with drive gear 61 to turn clockwise or downwardly in the direction indicated by the arrow b. Presser pin 63 mounted on sector gear 62 is therefore brought into abutment against arm 7a of lid 7 and, upon further rotation of sector gear 62, presser pin 63 presses arm 7a to turn lid 7 in an opening direction, as shown in FIG. 7D. Lid 7 is fully opened when sector gear 62 is turned to its downward limit position, as shown in FIG. 7E, at which point drive gear 61 is stopped to stop sector gear 62, thus holding lid 7 in the fully opened position. The rotary head drum and the tape loading mechanism, not shown, are now inserted into tape cassette 6, and the tape in tape cassette 6 is loaded around the rotary head drum by the tape loading mechanism.

Figure 7F:
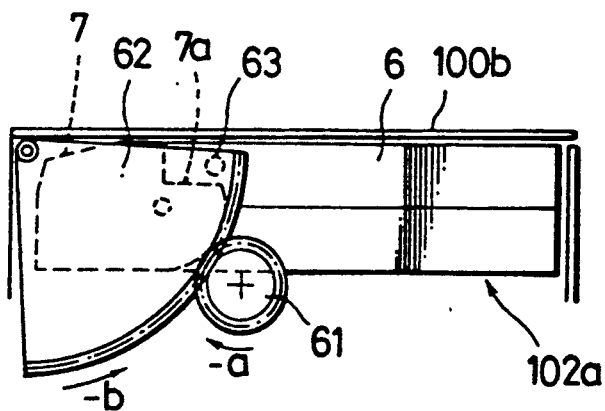

After the rotary head drum and the tape loading mechanism are completely inserted into tape cassette 6, drive gear 61 is rotated clockwise in the opposite direction indicated by the arrow −a in FIG. 7F, thereby turning sector gear 62 counterclockwise or upwardly in the direction indicated by the arrow −b, with the result that lid 7 follows presser pin 63. The released lid 7 is automatically turned to close the front open side of the tape cassette 6 under its own biasing spring. After the lid 7 is closed, drive gear 61 is then stopped to stop sector gear 62 in a substantially intermediate angular position, whereupon the upper edge of the sector gear 62 lies substantially flush with the upper surface of the tape cassette 6, as shown in FIG. 7F, and presser pin 63 is out of contact with arm 7a of lid 7. An appropriate upper panel 100b of the loading unit 102a is then lowered toward the upper surface of tape cassette 6, and the loading unit 102a is rendered compact in size.

Another embodiment of the present invention for opening and closing the lid of a tape cassette is shown in FIGS. 8A through 8F, in which a slide cam mechanism is provided. As shown in FIGS. 8A through 8F, a loading unit 104 for loading a tape cassette 6 supports on a side wall panel thereof a substantially V-shaped lever arm 64 that is pivotally mounted on a bearing 65 by a shaft 65a at an intermediate location 64a along lever arm 64. Lever arm 64 has a lid opening pin 67 on a front end thereof and an engagement pin 68 on a rear end thereof.

A slide cam 69, which is slidable toward and away from arm 64, is disposed behind lever arm 64 and has a cam groove 70 defined therein, with engagement pin 68 slidably riding in cam groove 70. Cam groove 70 includes a front lower horizontal portion 70a, a rear upper horizontal portion 70b, and an intermediate slanted portion 70c interconnecting front and rear cam groove portions 70a, and 70b. When slide cam 69 is moved back and forth, lever arm 64 is pivoted about shaft 65a by engaging pin 68 moving vertically as it slides along and up cam groove 70.

Figure 8A:
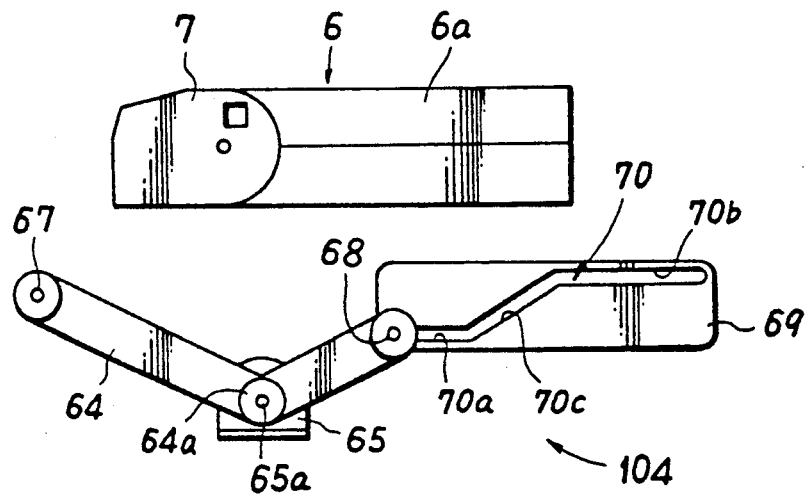
FIGS. 8A through 8F are elevational views showing a cassette lid opening mechanism according to another embodiment of the present invention.
Figure 8B:
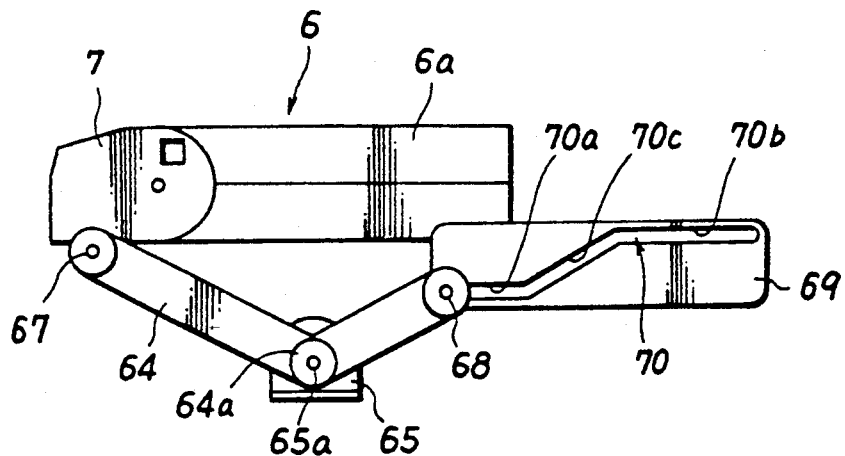

When tape cassette 6 is inserted into the loading unit 104, as shown in FIG. 8A, and lowered toward a predetermined position a front lower edge of lid 7 of tape cassette 6 is engaged by lid opening pin 67 and the front end of lever arm 64. At this time, engaging pin 68 on the rear end of arm 64 engages in the front lower horizontal portion 70a of cam groove 70, thereby holding lever arm 64 against angular movement about shaft 65a, as shown in FIG. 8B.

Figure 8C:
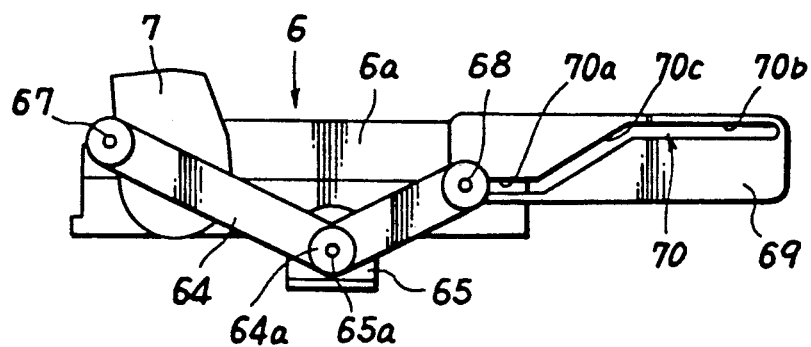

When tape cassette 6 is further lowered, lid 7 is pressed against lid opening pin 67 on the end of lever arm 64, which is held nonrotatable by pin 68 and cam groove portion 70a. Therefore, lid 7 is pushed upwardly in an opening direction, as shown in FIG. 8C. After the front side of cassette housing 6a of tape cassette 6 is made accessible by opening lid 7, the rotary head drum and the tape loading mechanism, not shown, are inserted into tape cassette 6, and the tape is loaded around the rotary head drum by the tape loading mechanism.

Figure 8D:
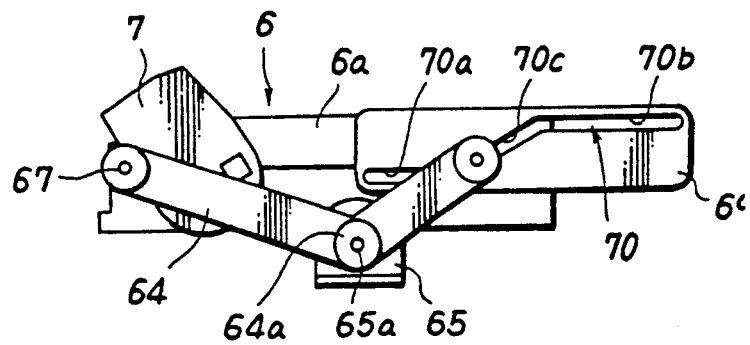
Figure 8E:
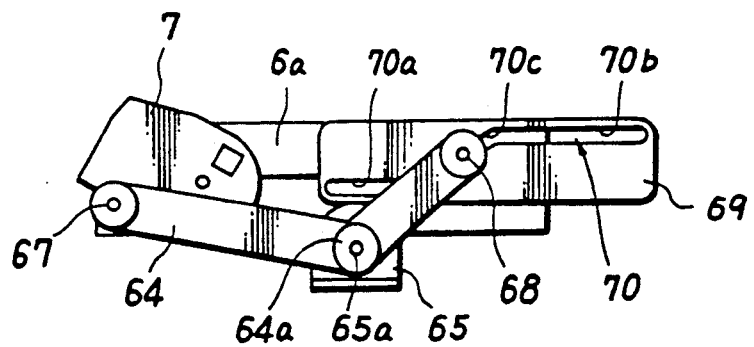
Figure 8F:
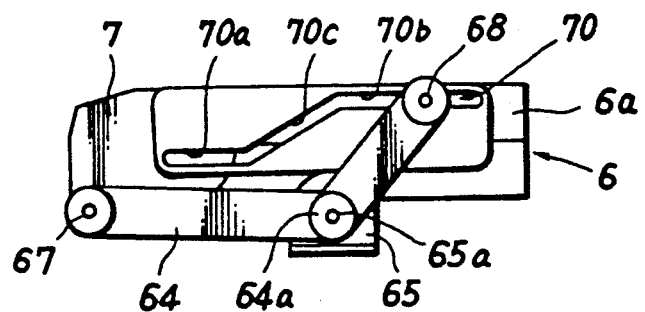
Figure 9A:
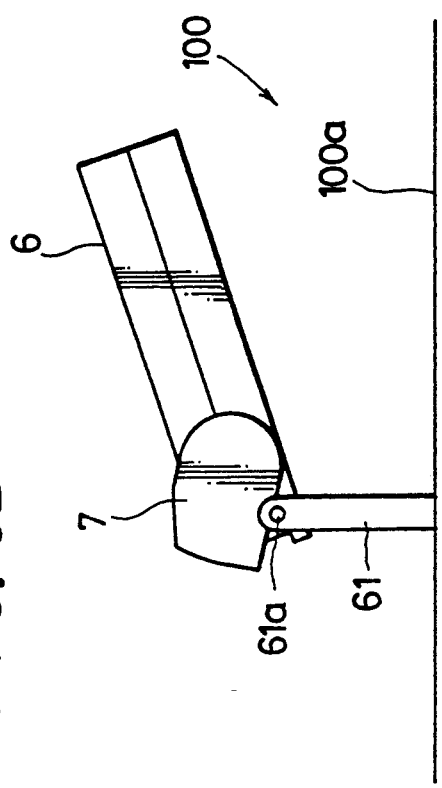
FIGS. 9A through 9D are elevational views showing the manner in which a conventional tape cassette lid is opened.
Figure 9B:
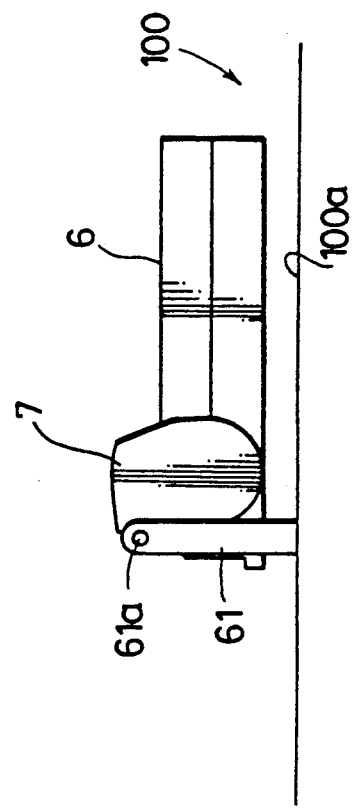
Figure 9C:
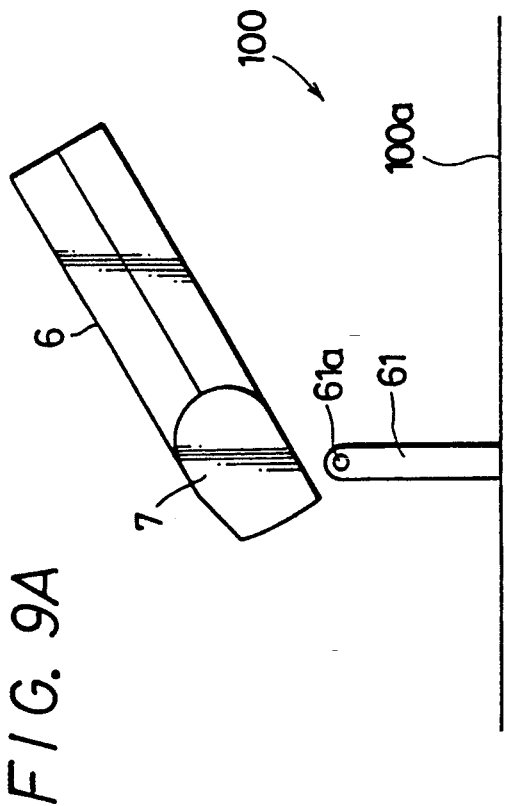
Figure 9D:
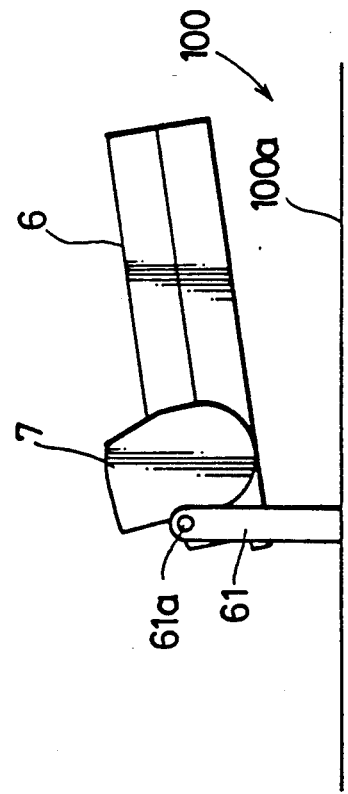

After the rotary head drum and the tape loading mechanism are completely inserted into tape cassette 6 and the tape is fully loaded around the rotary head drum, slide cam 69 is moved forward and engaging pin 68 slides along cam groove 70 from the front lower horizontal portion 70a onto the intermediate slanted portion 70c, as shown in FIG. 8D. Lever arm 64 is then rotated counterclockwise about shaft 65a, thereby lowering lid opening pin 67, which permits lid 7 to start moving downwardly and closing cassette housing 6a, as shown in FIG. BE.

Further forward movement toward the left in the drawing of slide cam 69 brings engaging pin 68 into the rear upper horizontal portion 70b of cam groove 70, and lever arm 64 is further turned counterclockwise about pin 65a to lower lid opening pin 67. Lid 7 is further lowered until it fully closes cassette housing 6a of tape cassette 6, at which time lever arm 64 is locked against any further rotation about pivot shaft 65a by means of pin 68 in cam groove portion 70b. Now, signals can be recorded on and reproduced from the tape in the tape cassette 6 by the recording and reproducing heads of the rotary head drum inserted in the tape cassette 6.

Figure 10:
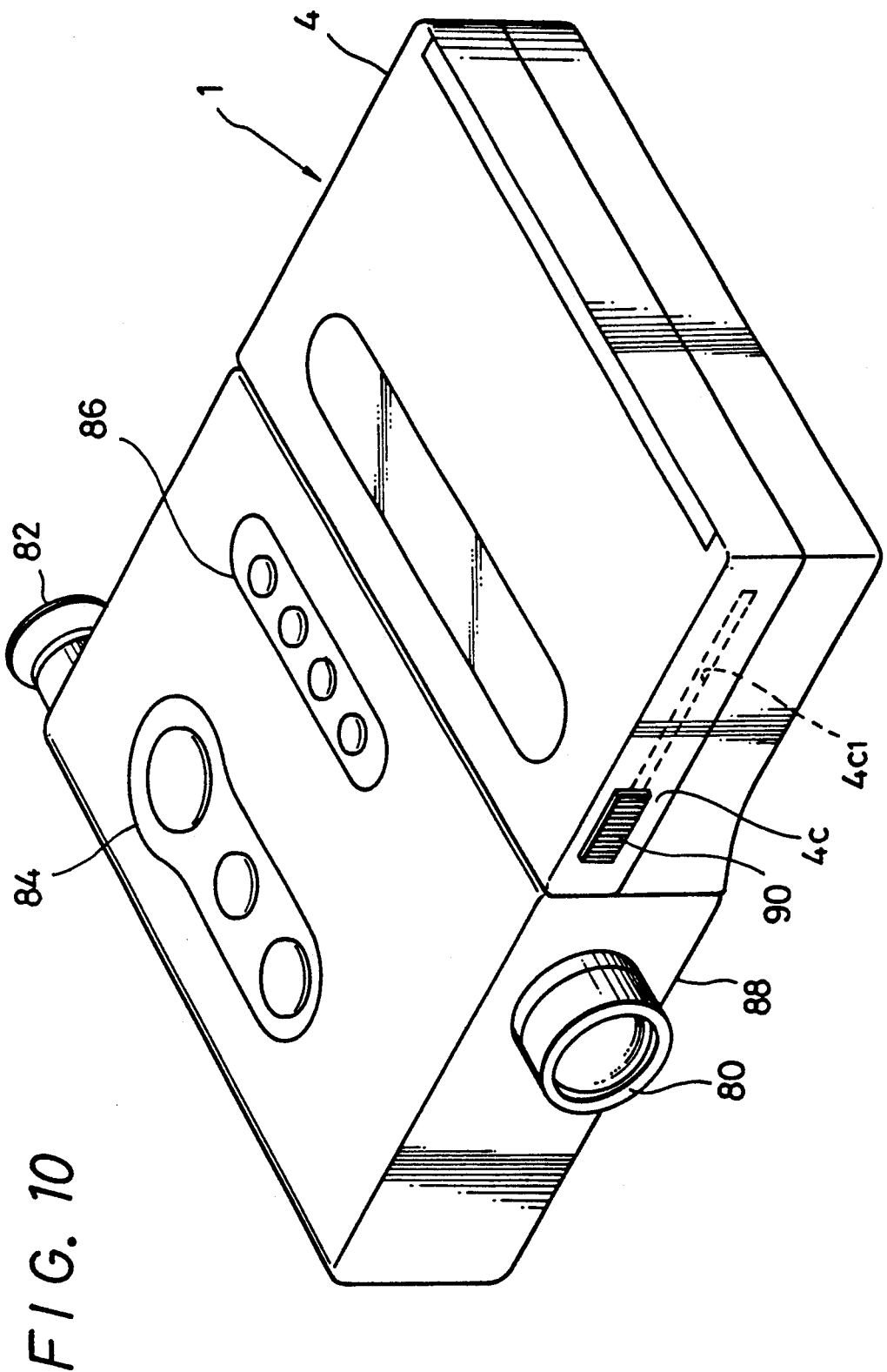
FIG. 10 is a perspective view of a portable video camera according to an embodiment of the present invention.

FIG. 10 shows a complete video camera assembly employing the deck mechanism described above. The overall electronics and optics of such camera can be generally the same as known 8-mm video cameras, which also all include a lens 80, a view finder 82, and operator controls, shown generally at 84 and 86. In this embodiment, the deck assembly 1 is arranged with its longer side dimension against corresponding side dimension of the camera body 88.

As was shown in FIG. 2, the third chassis 4 of the deck assembly 1 overlies the other elements of the deck mechanism in the closed position. Thus, correspondence is seen between FIG. 3 and FIG. 10, in which an upper panel 4a forms a top surface and side wall panels 4b and 4c form the sides. It is understood, of course, that in a complete camera assembly decorative coverings and finishes are applied so that the surfaces of panels 4a, 4b, 4c, for example, are not actually exposed or visible in the closed position. Guide slot 4c1 as shown in FIG. 1 is shown in phantom in FIG. 10. A slide catch 90 or the like is provided to open the deck mechanism for tape loading or removal, and FIG. 11 is a perspective view showing such opened arrangement.

Figure 11:
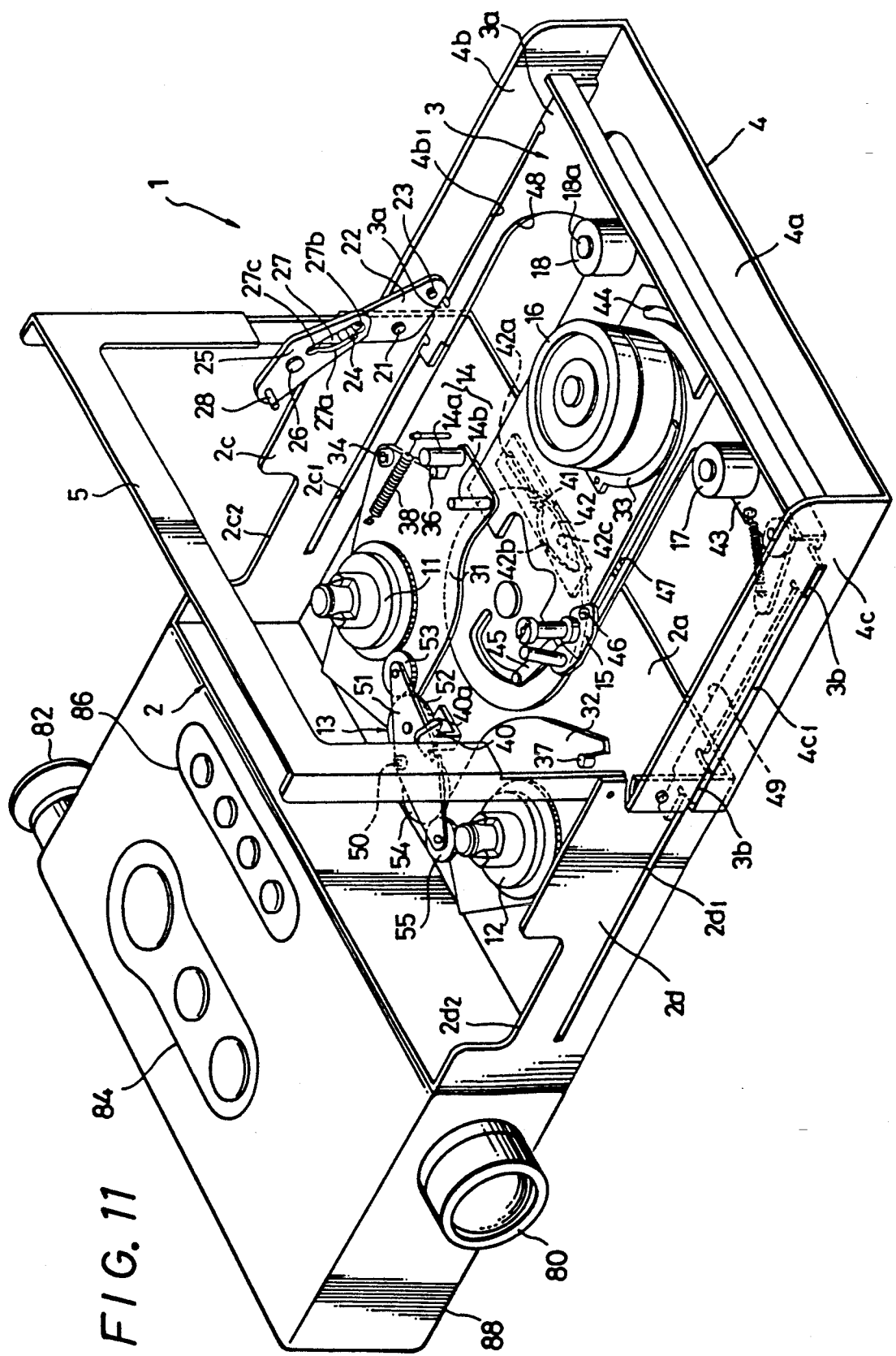
FIG. 11 is a perspective view of the camera of FIG. 10 shown in the opened position.

As shown in FIG. 11, the deck mechanism 1 in the open position has third chassis 4 pivoted away from first chassis 2 and second chassis 3 is in the withdrawn position. The presser frame 5 is also in the raised position. In this position the deck mechanism is now ready to receive a tape cassette, not shown, for loading. Thus, it is seen that by arranging the deck mechanism 1, which following the present invention can be constructed having a size in plan generally the same as an 8-mm tape cassette, with its longer side against a camera assembly, which is also generally the same size in plan as an 8-mm tape cassette, that a compact and portable 8-mm video camera structure can be achieved. Such small size camera could not heretofore be achieved because of the requirement to make the deck assembly large enough to accommodate the cassette plus at least part of the head drum assembly outside of such cassette. The present invention makes the embodiment of FIG. 11 possible because the head drum assembly is inserted fully into the cassette body and the tape lid is then closed.

Figure 12:
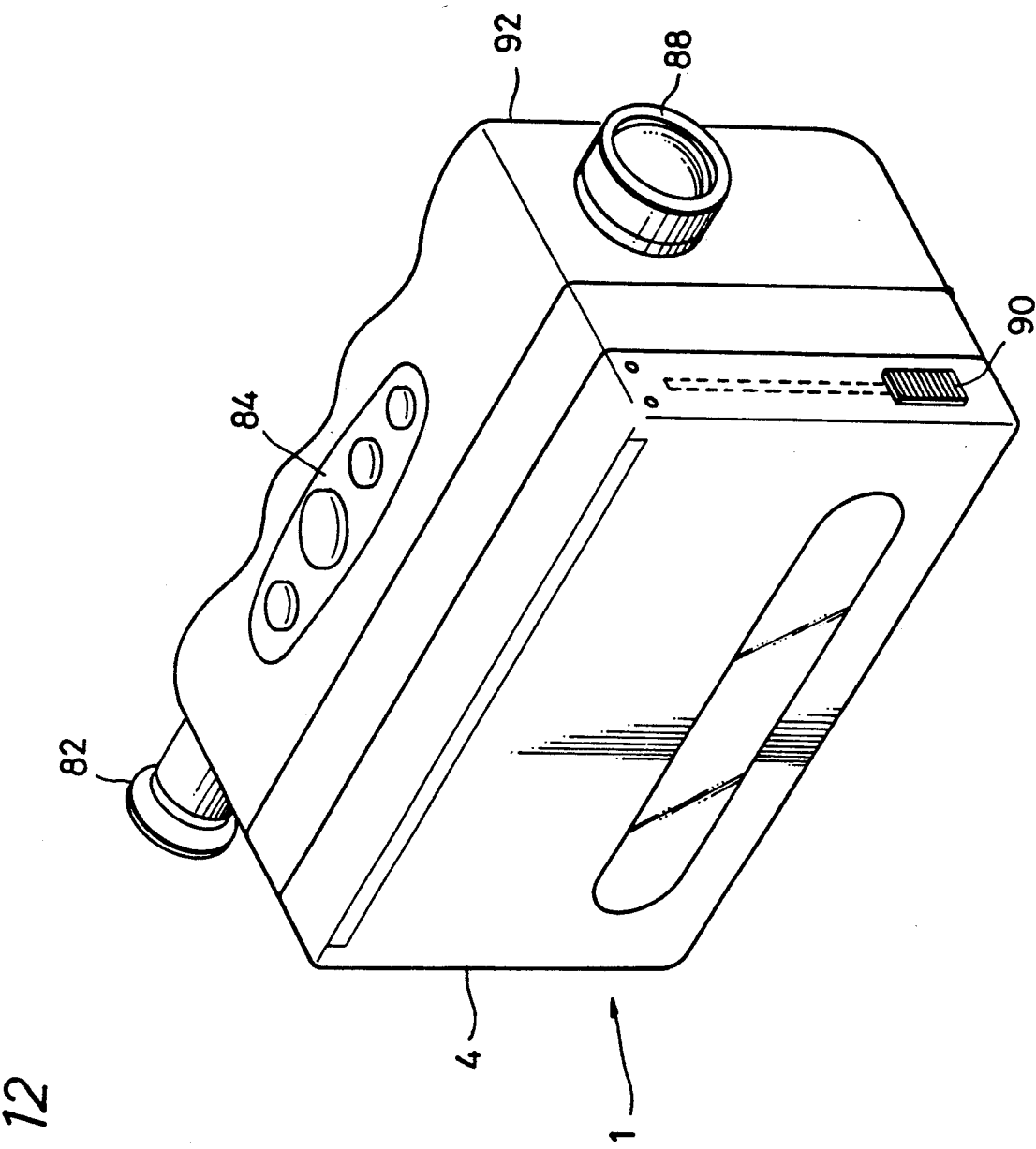
FIG. 12 is a perspective view of a portable video camera according to another embodiment of the present invention.

FIG. 12 is another embodiment of a complete video camera assembly also employing the deck mechanism described above. The overall camera components and electronics employed in the embodiment of FIG. 10 are likewise employed here but are rearranged to form a more square or brick-shaped structure, in place of the flat construction of the embodiment shown in FIG. 10. In the embodiment of FIG. 12, the deck mechanism 1 is arranged with its large flat bottom surface being adjacent a flat side wall of the camera body 92. This provides a more square construction and a different aspect ratio than the flat embodiment of FIG. 10. A suitable slide catch 90 or the like is provided to open the deck mechanism to permit tape loading and unloading.

Figure 13:
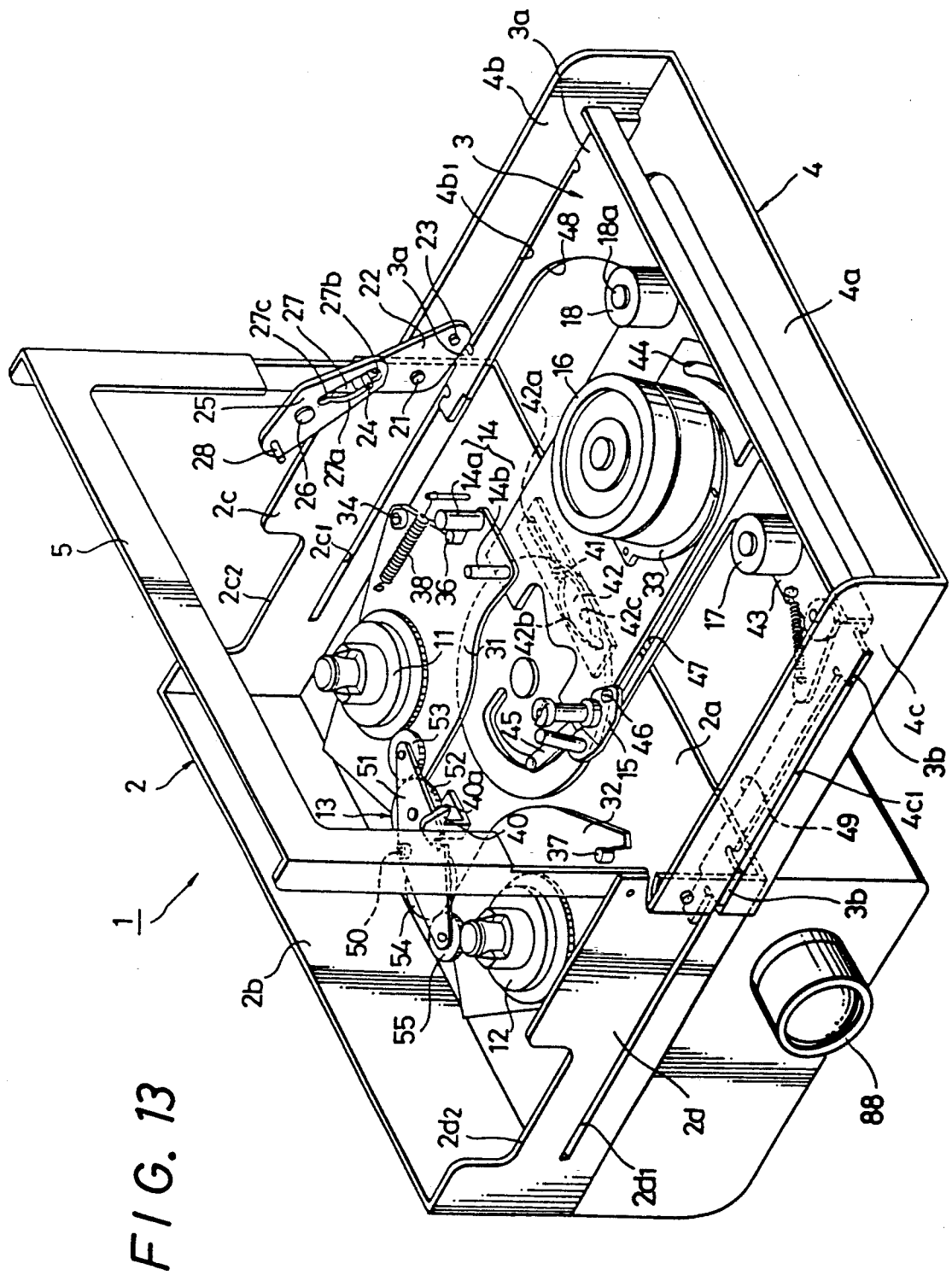
FIG. 13 is a perspective view of the camera of FIG. 12 shown in the opened position.

In FIG. 13, the deck mechanism 1 is in the opened position with third chassis 4 pivoted up and away from first chassis 2 and into coplanar alignment therewith. As explained hereinabove, once third chassis 4 is coplanar with first chassis 2 then second chassis 3 can be withdrawn back into second chassis 4. Presser frame 5 is shown in the upraised position and in this position the deck mechanism 1 is ready to receive a tape cassette, not shown. Once such cassette is inserted, presser frame 5 is closed, a motor, not shown, is actuated to drive second chassis 3 with head drum 16 and the like into the expanded open space in the tape cassette with movable reels, the cassette lid is closed, and third chassis 4 is pivoted to be closed over the cassette, presser frame 5, and first chassis 2. At this point the video camera is ready to record or reproduce image signals.

As noted above, the inventive deck mechanism is roughly the same size as an 8-mm video cassette. Therefore, the overall video camera assembly can be provided having a size based on those guidelines. For example, in the embodiment shown in FIG. 10 the following dimensions are achieved: overall width across the front where the lens is located—147 mm; overall depth—100 mm; thickness at the side where the optics are located—47 mm; and thickness at the side corresponding to the deck mechanism—37 mm. On the other hand, exemplary dimensions for the embodiment shown in FIG. 12 can be achieved as follows: overall width across the front—65 mm; overall height—67 mm; and overall depth along the deck mechanism side—100 mm.

It will be quickly appreciated from the above dimensions that a video camera constructed with the inventive deck mechanism is quite handy and compact.

According to the present invention, as described above, cassette reels having the tape wound therearound are movable to increase the dead space in the tape cassette into which the recording and reproducing heads on the rotary head drum are inserted. The reel supports of the deck are moved by the mechanism that moves the recording and reproducing heads with respect to the tape cassette loaded in the deck mechanism and because the cassette tape reels are mounted on the reel supports they are moved as well. Therefore, the number of drive sources required is reduced. The deck mechanism may be of a low profile since at least the structure for moving the reel supports in response to movement of the recording and reproducing heads may be of a thickness smaller than the height of the mechanism that moves the recording and reproducing heads with respect to the loaded tape cassette.

Since the reel supports can be moved by a simple arrangement, the number and cost of components used are reduced, and the procedure for adjusting the assembled components is simplified.

Further in keeping with this invention described above, when a tape cassette having a lid for opening and closing an opening intended for insertion of a rotary head drum and a tape loading mechanism, is loaded into a loading unit of a VTR or a DAT, the lid is opened to allow the rotary head drum and the tape loading mechanism to be fully inserted into the tape cassette. After the rotary head drum and the tape loading mechanism are inserted in the tape cassette, the lid is closed again, and signals are recorded and/or reproduced by the rotary head drum inserted in the tape cassette with the lid closed. During the signal recording and reproducing process, the tape cassette remains closed by the lid. Therefore, any means for urging the tape cassette to be retained in a desired position is simplified. Furthermore, because the lid does not project above the flat configuration of the tape cassette during the signal recording or reproducing process, the deck mechanism of the magnetic recording and reproducing device may have maximum dimensions that are substantially the same as those of the tape cassette, and hence may be of a low profile and a small size.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. A system including a cassette and a device for loading a cassette into a recording/reproducing apparatus, comprising:

a tape cassette having tape take-up and supply reels arranged therein for movement so as to increase a dead space at a front of said tape cassette;

a first chassis on which a pair of reel drive spindles are slidably mounted for receiving the take-up and supply reels of said tape cassette loaded thereon;

a second chassis having a recording/reproducing head mounted thereon, said second chassis being slidably mounted on said first chassis; and chassis guide means for providing relative motion between said first chassis and said second chassis and for providing selective movement of said recording/reproducing head on said second chassis into the increased dead space in said tape cassette and for providing movement of said pair of reel drive spindles away from said recording/reproducing head, thereby moving said take-up and supply reels.

2. The system of claim 1, wherein said pair of reel drive spindles are mounted on respective ones of a pair of reel support chassis pivotally attached to said first chassis, and bias means for biasing said pair of reel support chassis to a first position.

3. The system of claim 2, wherein said recording/reproducing head is mounted on a head drum base mounted on said second chassis and arranged to contact said pair of reel support chassis when said recording/reproducing head is moved into said dead space for moving said pair of reel support chassis against the force of said biasing means.

4. The system of claim 1, in which said cassette has a movable lid at a front side thereof covering the tape, and further comprising lid moving means for moving said lid during a cassette loading operation.

5. The system of claim 4, further comprising tape loading means for guiding said tape into contact with said recording/reproducing head.

6. The system of claim 5, in which said lid moving means includes means for opening the lid of said cassette during loading thereof and closing the lid of said cassette after said tape is guided into contact with said recording/reproducing head.

7. The system of claim 1, said tape cassette further comprising a pair of reel supports having said tape-up and supply reels mounted respectively thereon and pivot means pivotally mounting said reel supports to a body of said tape cassette, whereby said tape-up and supply reels are movable to increase said dead space at the front of said tape cassette.

8. The system of claim 7, further comprising reel support lock means mounted on said body of said tape cassette for locking said reel supports against pivoting motion about said pivot means.

9. The system of claim 8, further comprising an unlocking member mounted on said first chassis for unlocking said reel support locking means and permitting pivoting movement of said reel supports.

10. A loading device for loading a tape cassette into a recording/reproducing apparatus, the device comprising:

a pair of movable reels mounted within the cassette;

a pair of reel drive spindles corresponding respectively to said pair of movable reels;

a first chassis on which said pair of reel drive spindles are movably mounted for sliding motion;

a second chassis having a recording/reproducing head mounted thereon, said second chassis being slidable relative to said first chassis;

guide means arranged on said first and second chassis for providing relative motion between said first chassis and said second chassis and selective movement of said recording/reproducing head toward and away from said pair of reel drive spindles in response to motion of said second chassis.

11. The loading device according to claim 10, in which said guide means includes means for providing movement of said pair of reel drive spindles in a direction away from the recording/reproducing head in response to said recording/reproducing head moving toward said pair of reel drive spindles.

12. The loading device according to claim 11, further comprising tape loading means for guiding said tape in the cassette into contact with said recording/reproducing head.

13. The loading device according to claim 12, in which said guide means includes spring means for resiliently moving said pair of reel drive spindles to a position toward said recording/reproducing head.

14. The loading device according to claim 13, in which said first chassis includes means for mounting said reel drive spindles for pivotal motion, so as to pivot away from said recording/reproducing head in response to said movement of said recording/reproducing head toward said pair of reel drive spindles.

15. The loading device according to claim 14, in which said second chassis includes guide rail means for causing said tape loading means to guide said tape into contact with said head.

16. A loading device according to claim 10, in which the cassette has a movable lid at one side thereof covering the tape, and further comprising lid moving means for moving the lid of the cassette during a cassette loading operation.

17. The tape loading device according to claim 16, further comprising tape loading means for guiding said tape into contact with said head.

18. The loading device according to claim 17, in which said lid moving means includes means for opening the lid of said cassette during loading thereof and closing the lid of said cassette after said cassette is loaded in the recording/reproducing apparatus.

19. A system including a cassette and a device for loading a cassette into a recording/reproducing apparatus, comprising:

a tape cassette having tape take-up and supply reels and a movable lid at one side thereof covering the tape;

a chassis on which said tape cassette is loaded, having a pair of drive spindles for respectively receiving said tape take-up and supply reels of said tape cassette loaded thereon; and lid moving means mounted on said chassis for moving said lid during a cassette loading operation independently of movement of said cassette during the loading operation, wherein said movable lid includes an arm and said lid moving means comprises a sector gear having a pin mounted thereon for contacting said arm and a pinion gear for driving said sector gear in a predetermined direction, to cause said pin to contact said arm and open said lid.

20. The system of claim 19, wherein said pinion gear is driven in a direction opposite to said predetermined direction to move said pin out of contact with said arm, thereby to close said lid of said cassette.

21. The system of claim 19, further comprising tape loading means, and wherein said chassis includes first and second slidable members, said first slidable member having said tape take-up and supply reels mounted thereon and said second slidable member having a head drum and tape loading means mounted thereon, and means for sliding said second sliding member into engagement with said first sliding member after a tape cassette has been loaded on said first sliding member and after said lid moving means opens said lid, whereby said tape is guided into contact with said head drum by said tape loading means, and wherein said pinion gear is driven in a direction opposite to said predetermined direction to move said pin out of contact with said arm thereby to close said lid of said cassette with said head drum therein.

22. A system including a cassette and a device for loading a cassette into a recording/reproducing apparatus, comprising:

a tape cassette having tape take-up and supply reels and a movable lid at one side thereof covering the tape;

a chassis on which said tape cassette is loaded, having a pair of drive spindles for respectively receiving said tape take-up and supply reels of said tape cassette loaded thereon; and lid moving means mounted on said chassis for moving said lid during a cassette loading operation independently of movement of said cassette during the loading operation, wherein said movable lid includes an arm and said lid moving means comprises a lever arm having a pin at a leading end thereof for contacting said arm of said lid and engaged at a trailing end with a cam means movable in at least two strokes, so that upon a first stroke of said cam means, said pin contacts said arm and opens said lid.

23. The system of claim 22, wherein said cam means includes a cam portion engaging said trailing end of said lever arm, so that upon a second stroke of said cam means said pin of said lever arm moves away from said arm of said lid thereby to close said lid of said cassette.

* * * * *